July 7, 1936. M. E. CROWELL ET AL 2,046,549
APPARATUS FOR IMPREGNATING TIMBERS, TIES AND THE LIKE
Original Filed June 25, 1932 17 Sheets-Sheet 1
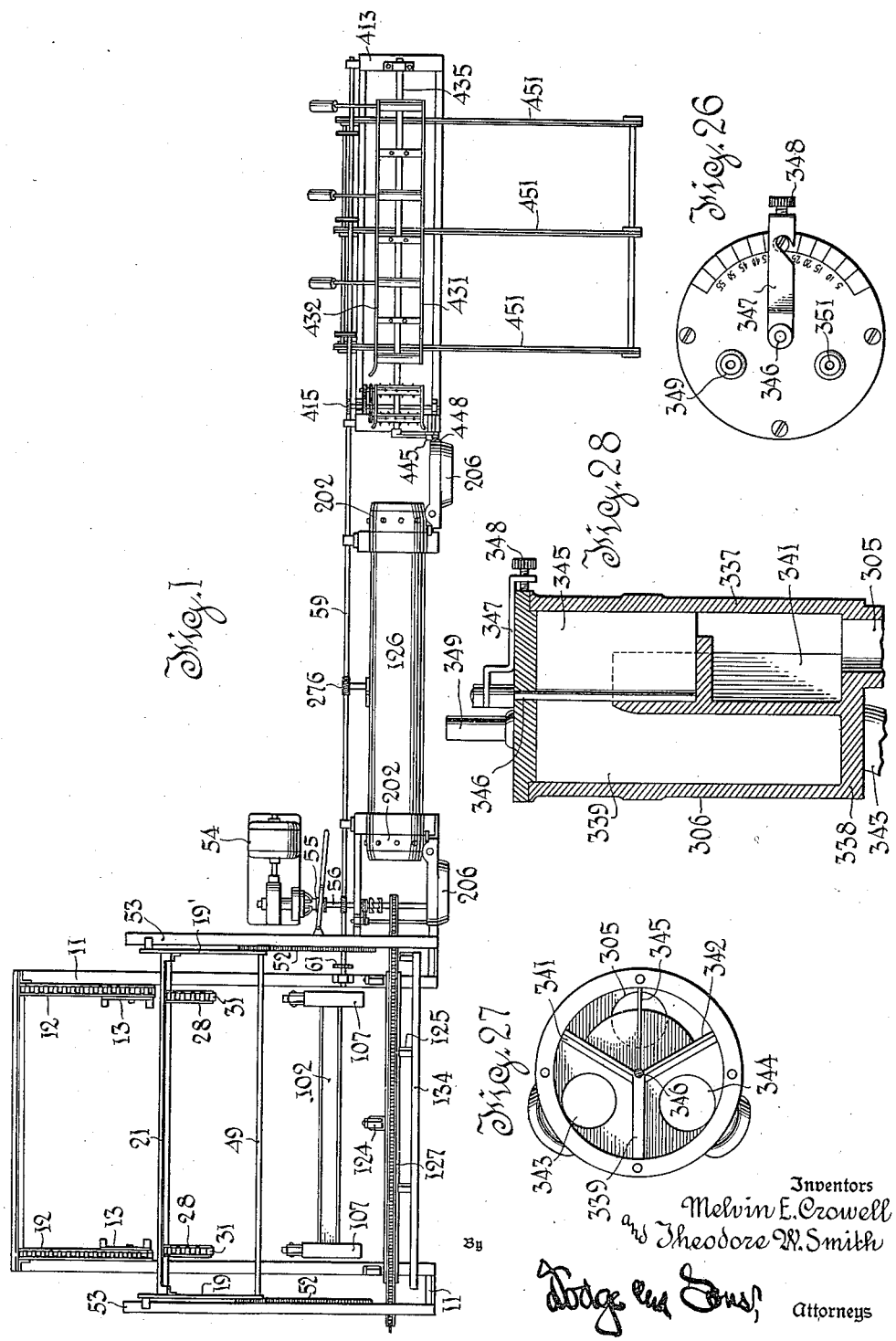
Inventors
Melvin E. Crowell
and Theodore W. Smith
Attorneys

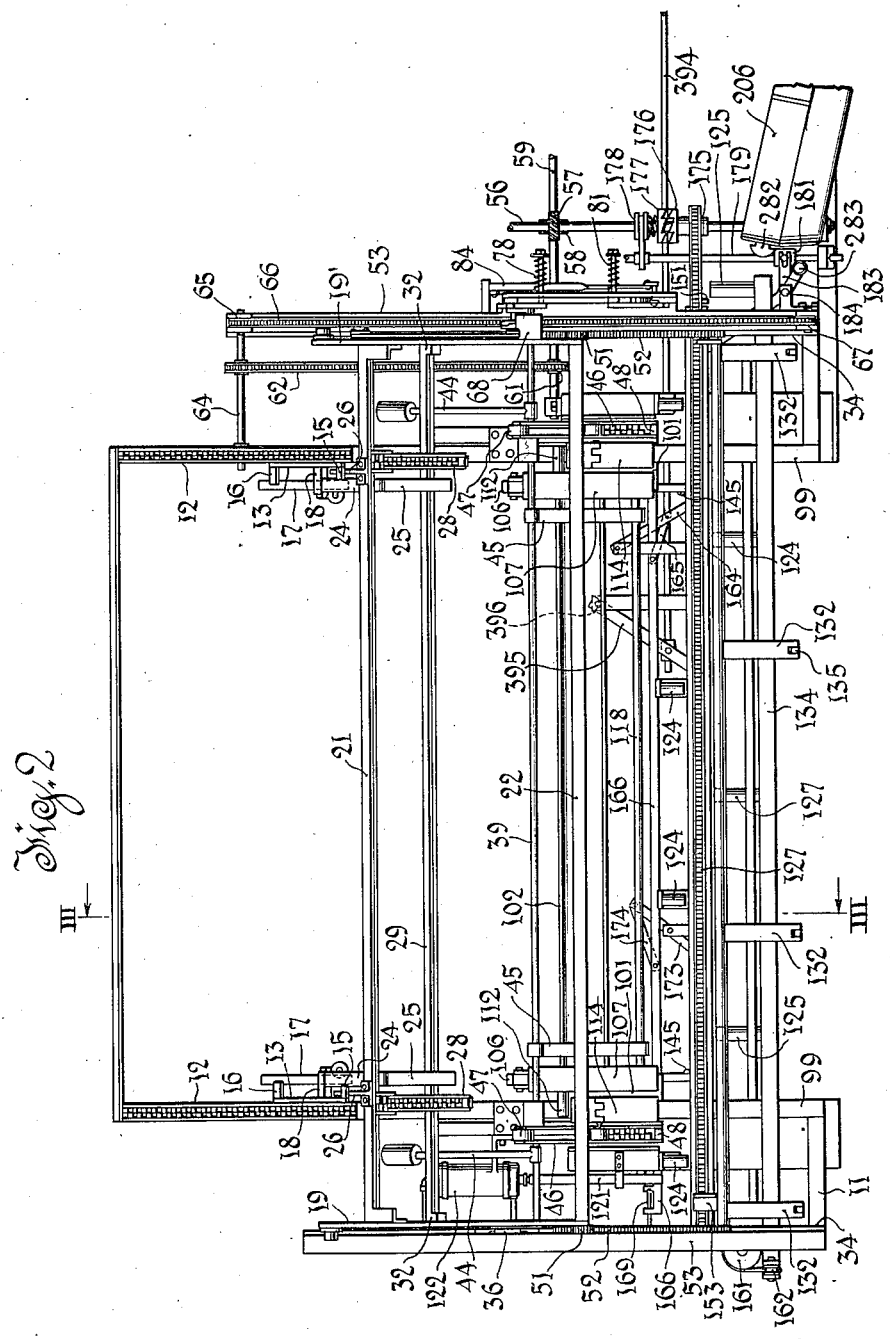

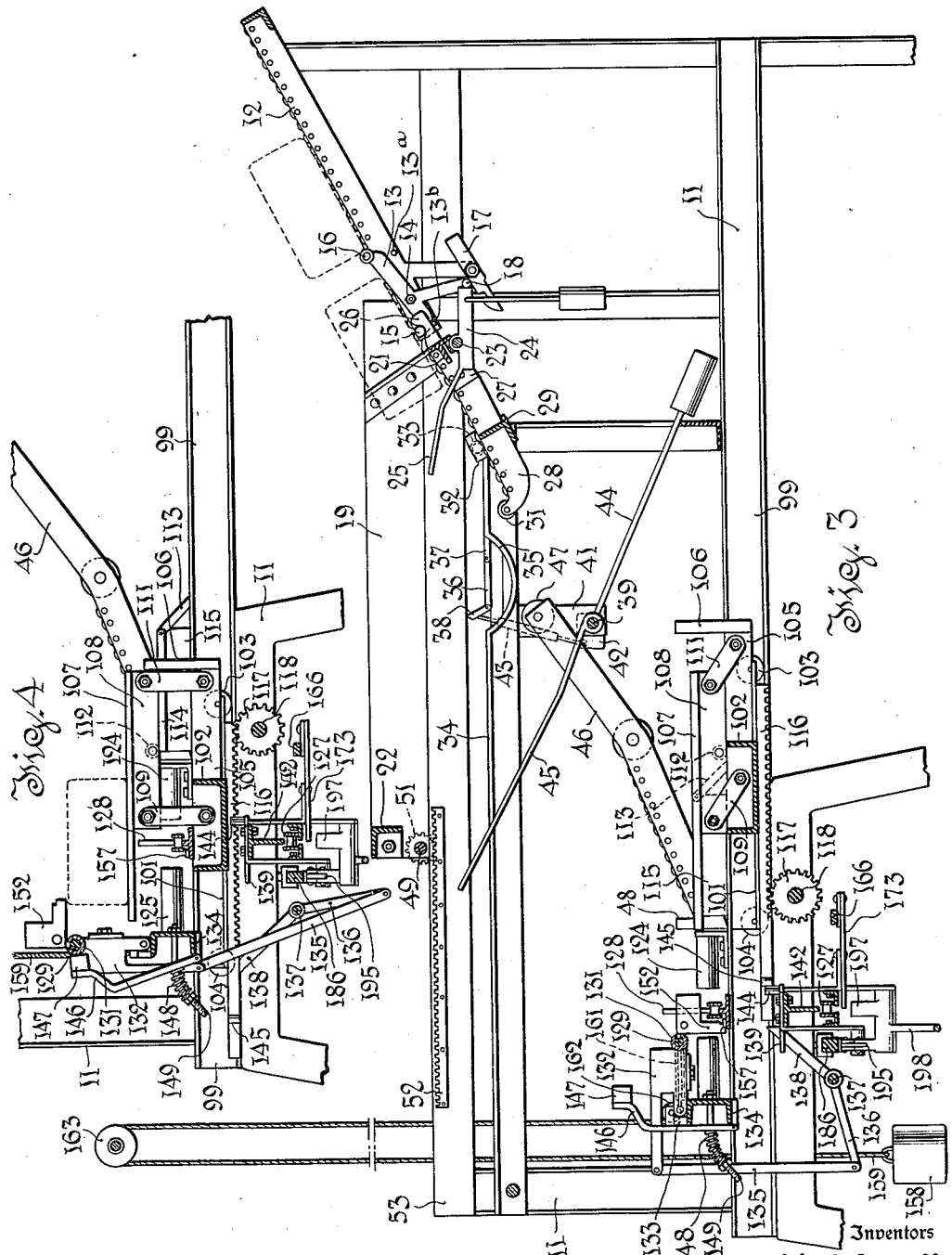

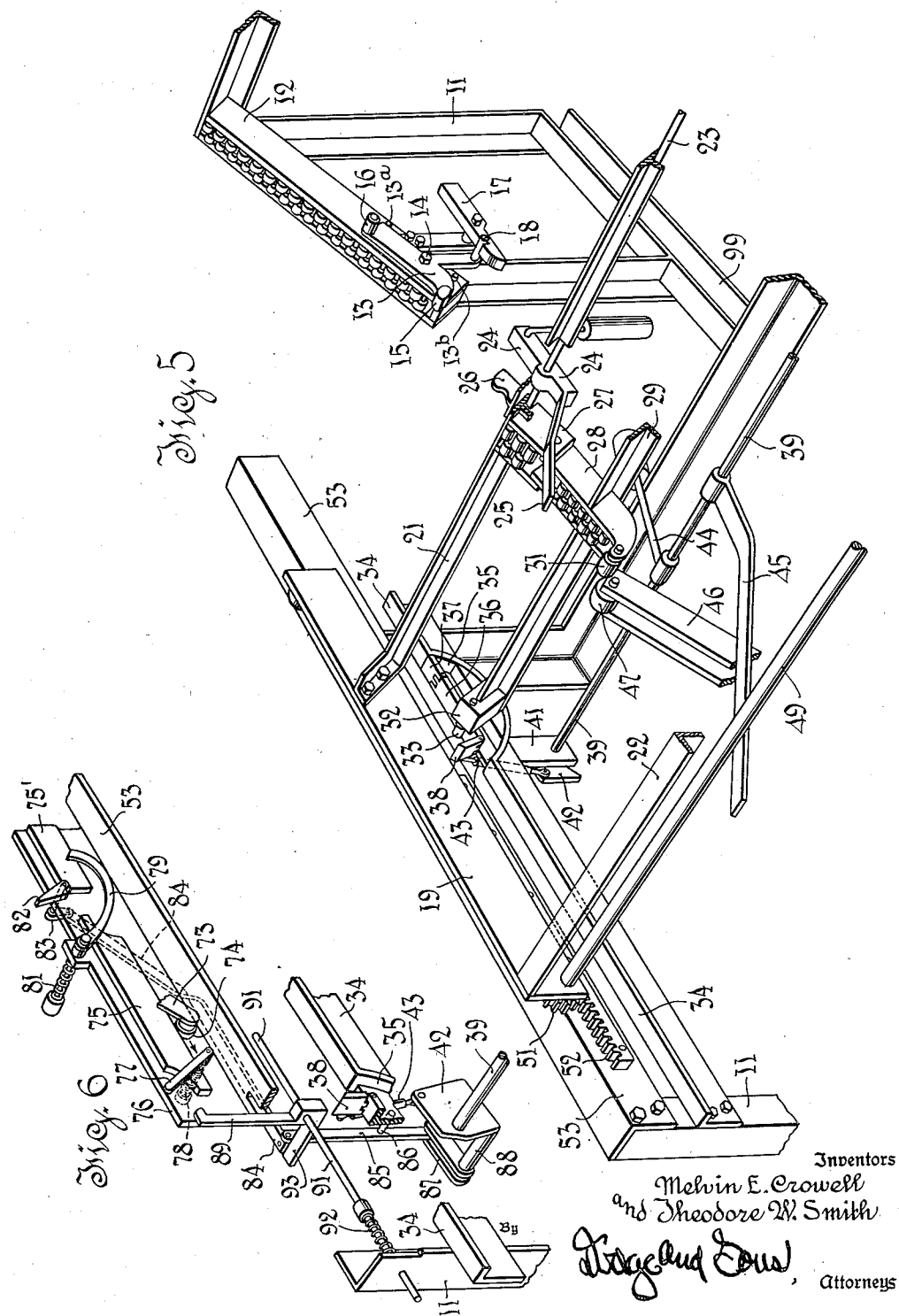

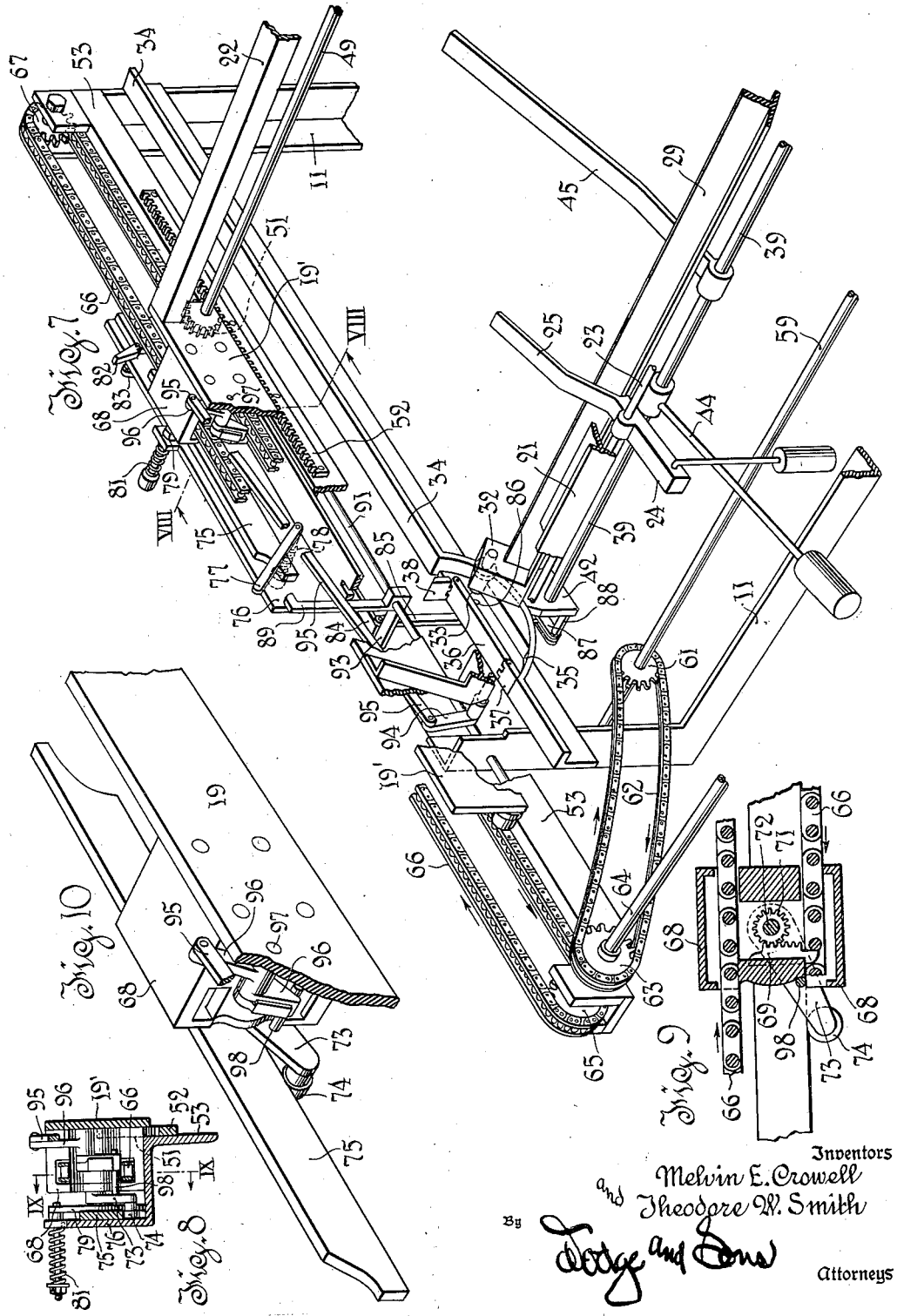

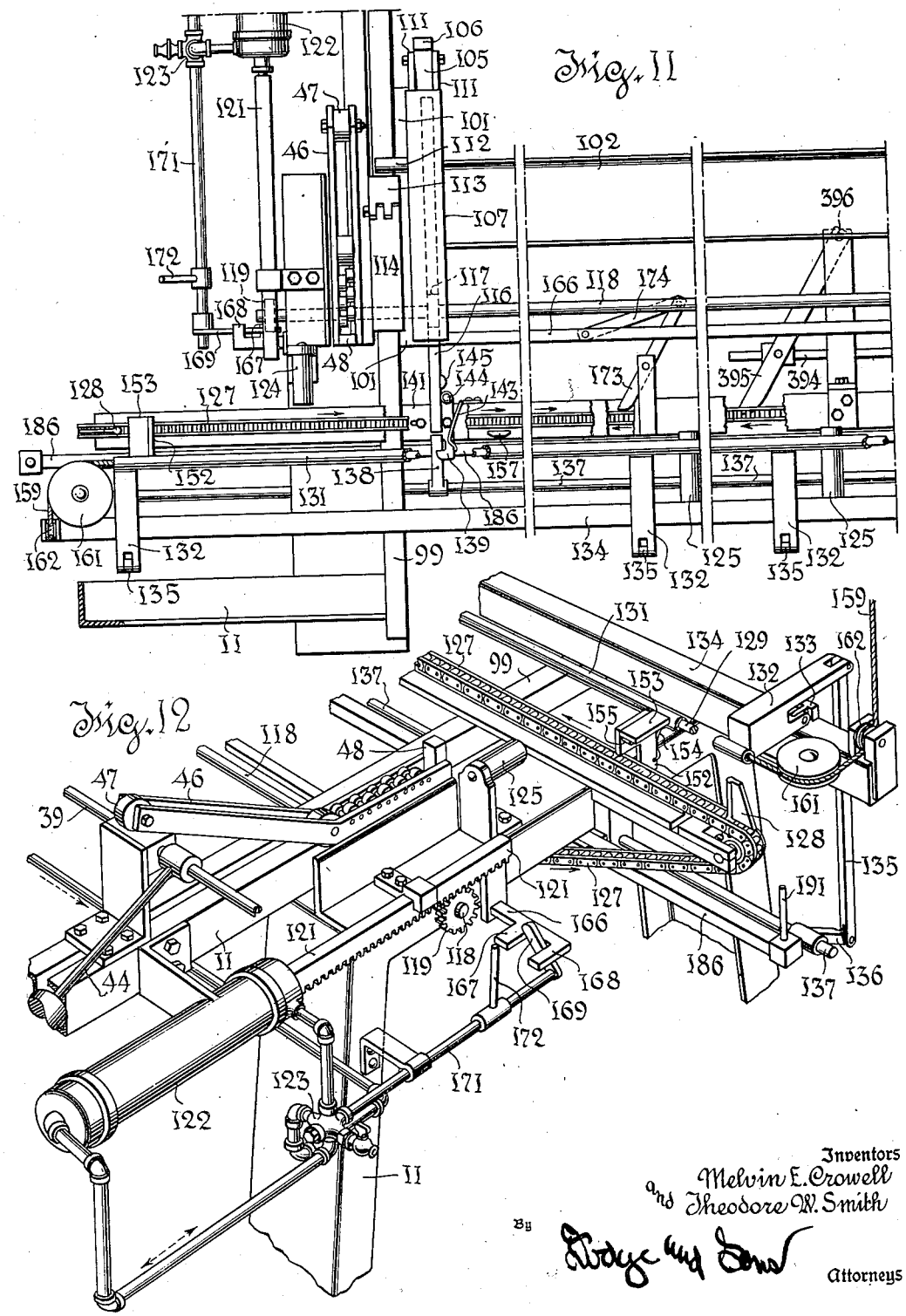

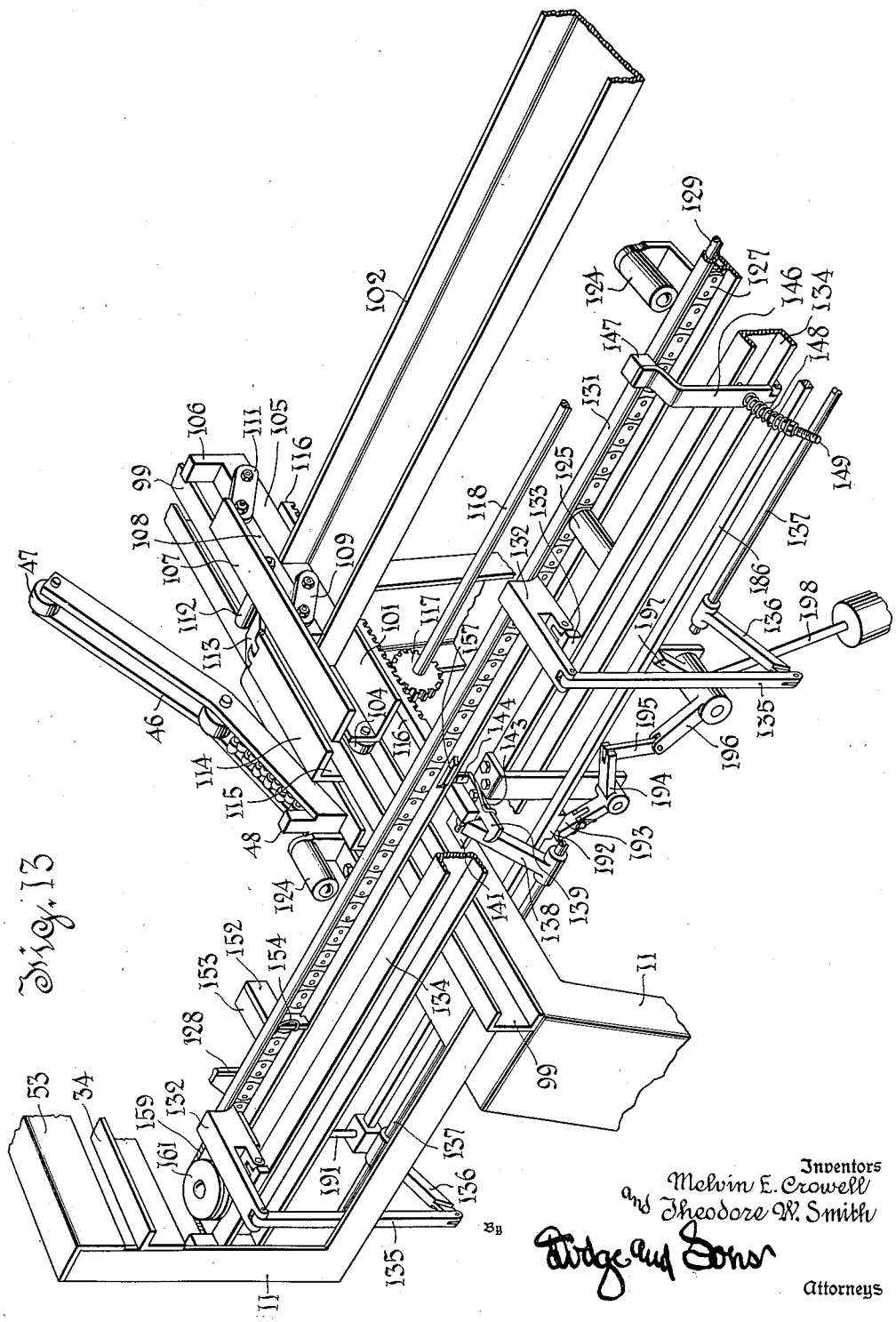

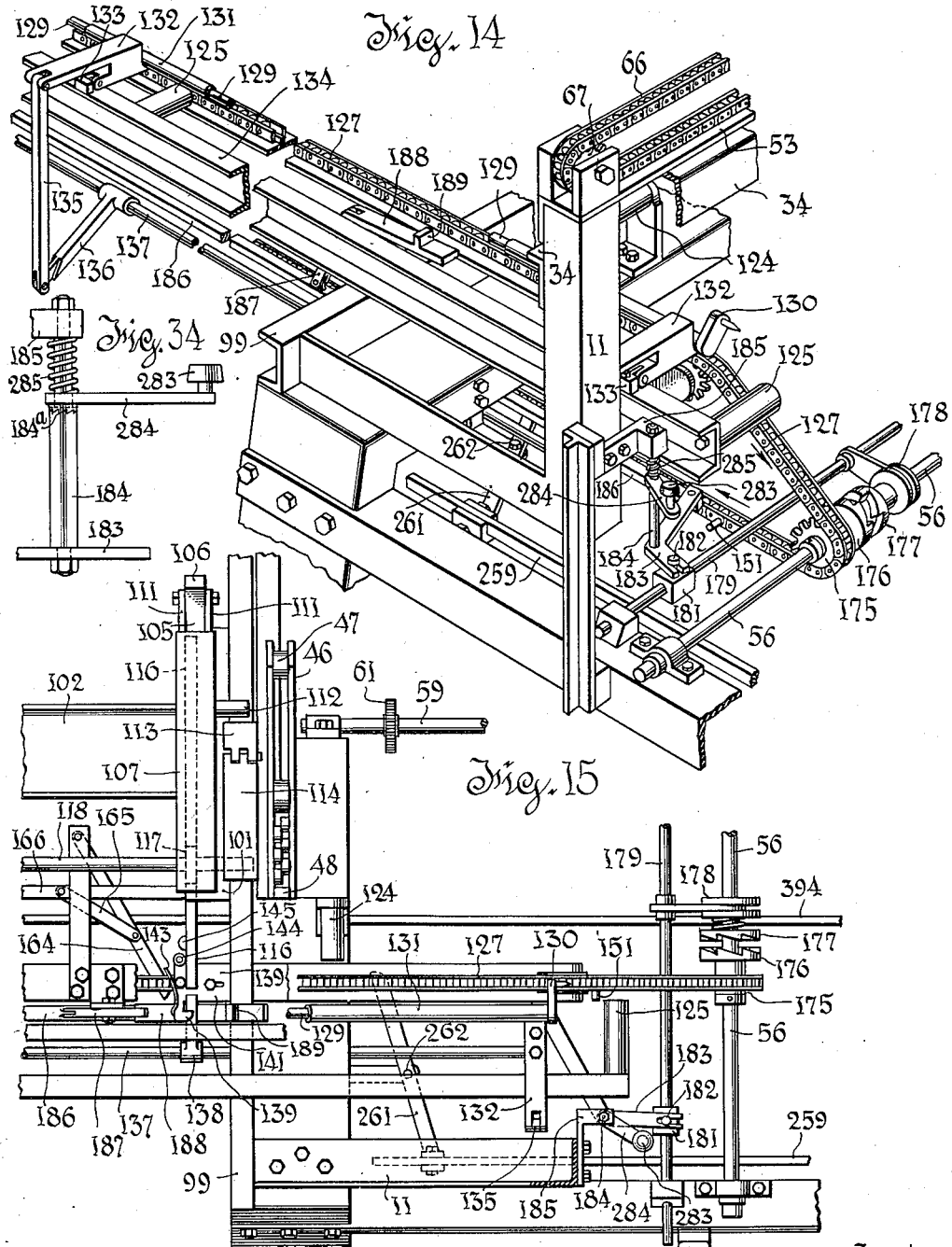

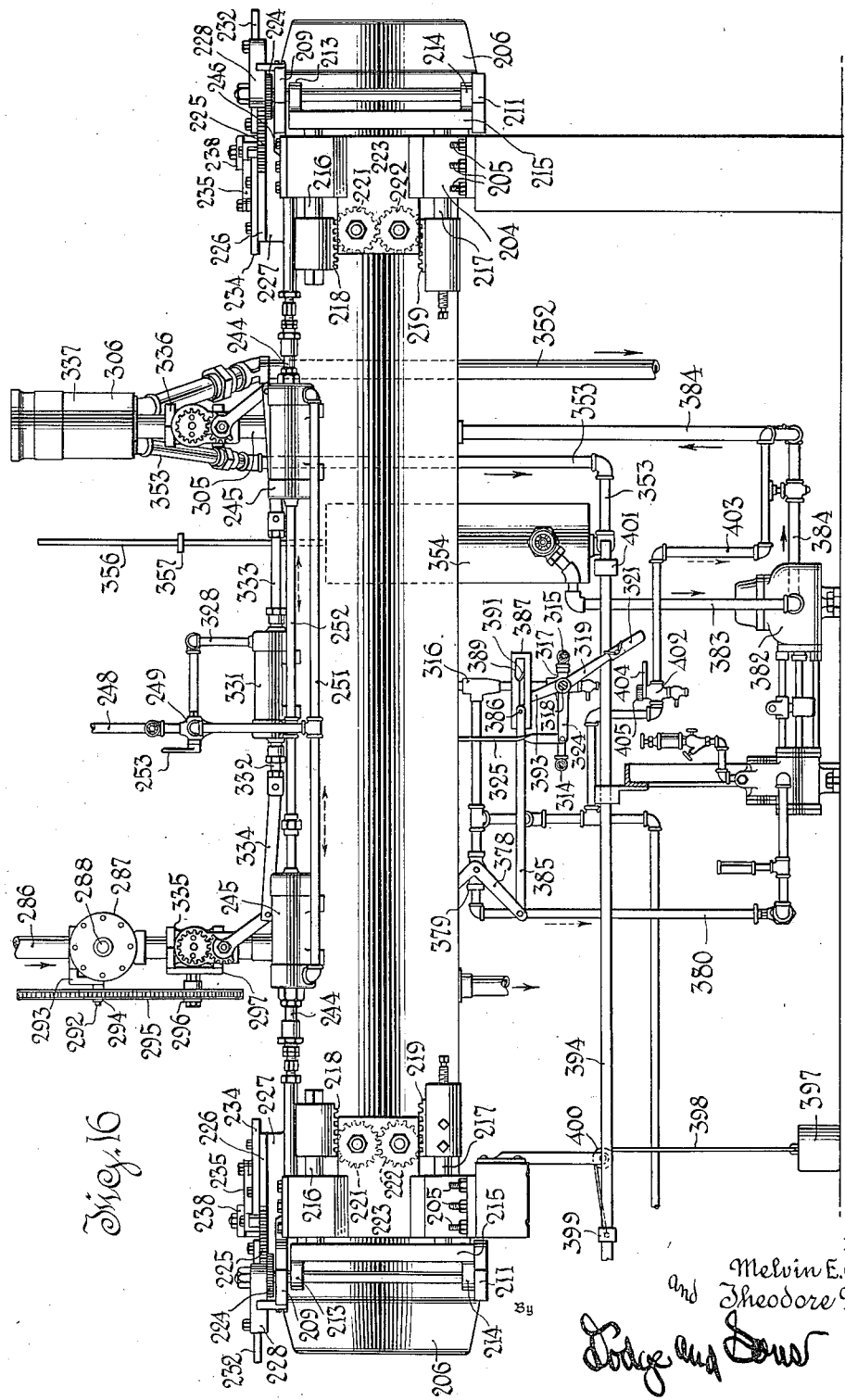

July 7, 1936.  M. E. CROWELL ET AL  2,046,549
APPARATUS FOR IMPREGNATING TIMBERS, TIES AND THE LIKE
Original Filed June 25, 1932  17 Sheets-Sheet 10
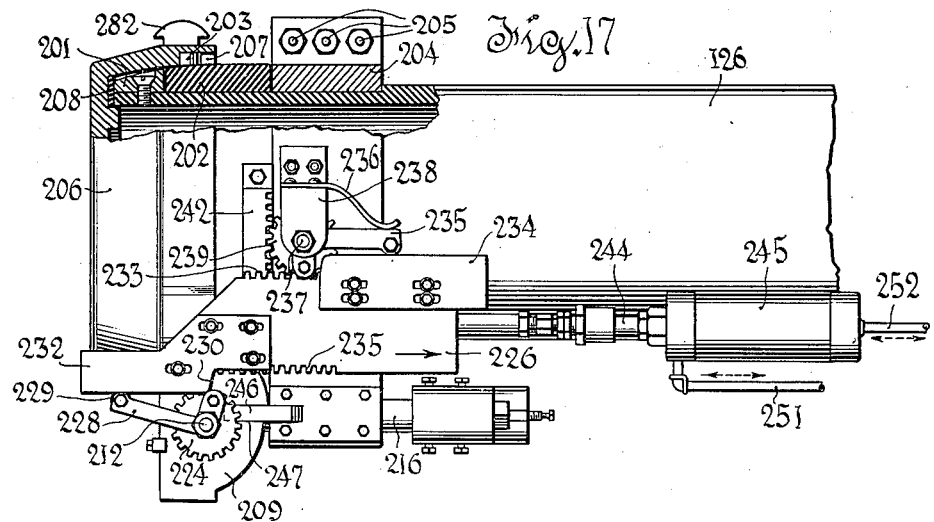
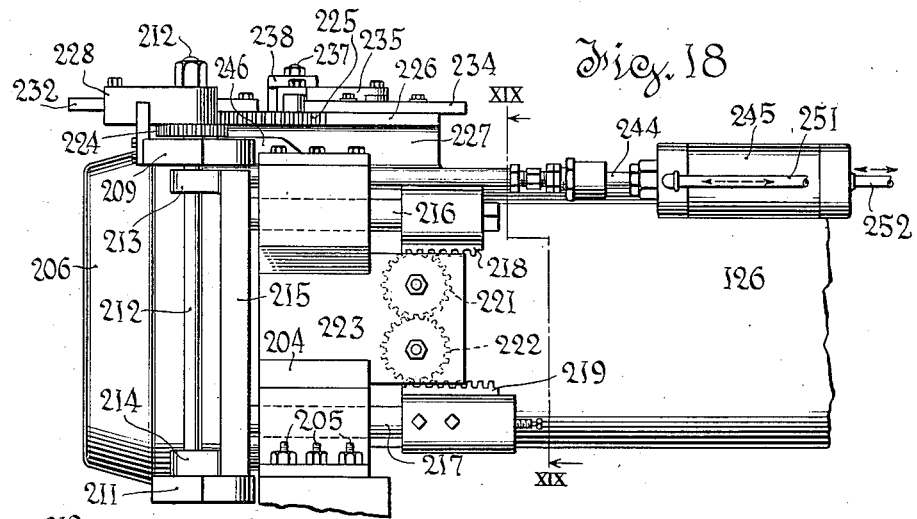
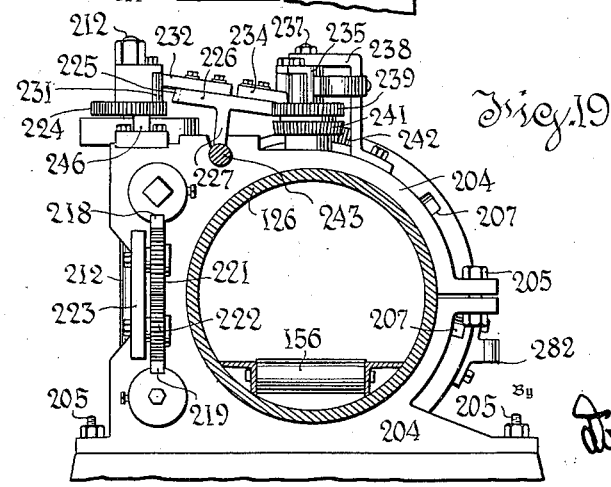
Inventors
Melvin E. Crowell
and Theodore W. Smith
Attorneys July 7, 1936.   M. E. CROWELL ET AL   2,046,549
APPARATUS FOR IMPREGNATING TIMBERS, TIES AND THE LIKE
Original Filed June 25, 1932   17 Sheets-Sheet 11
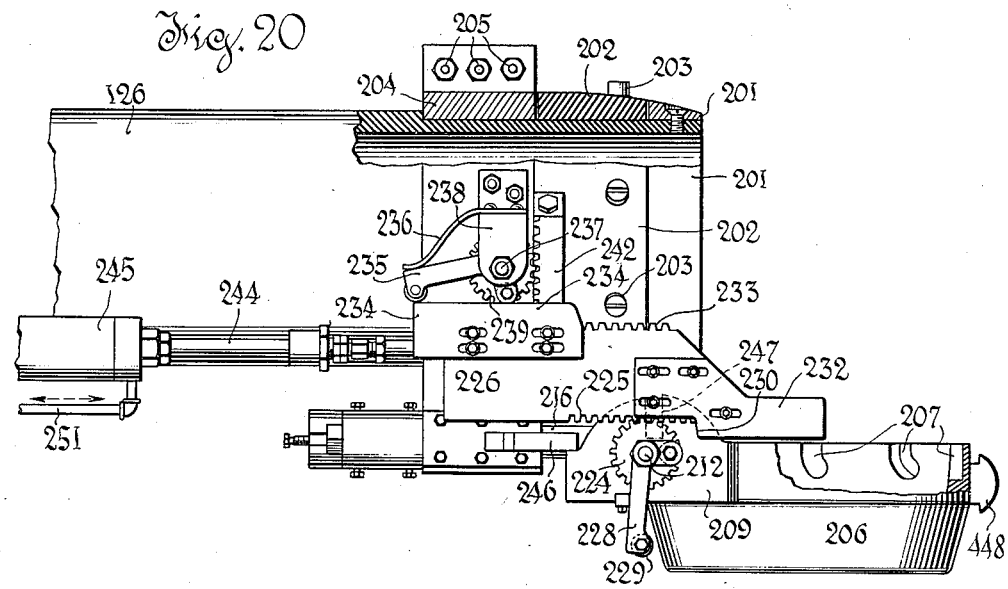
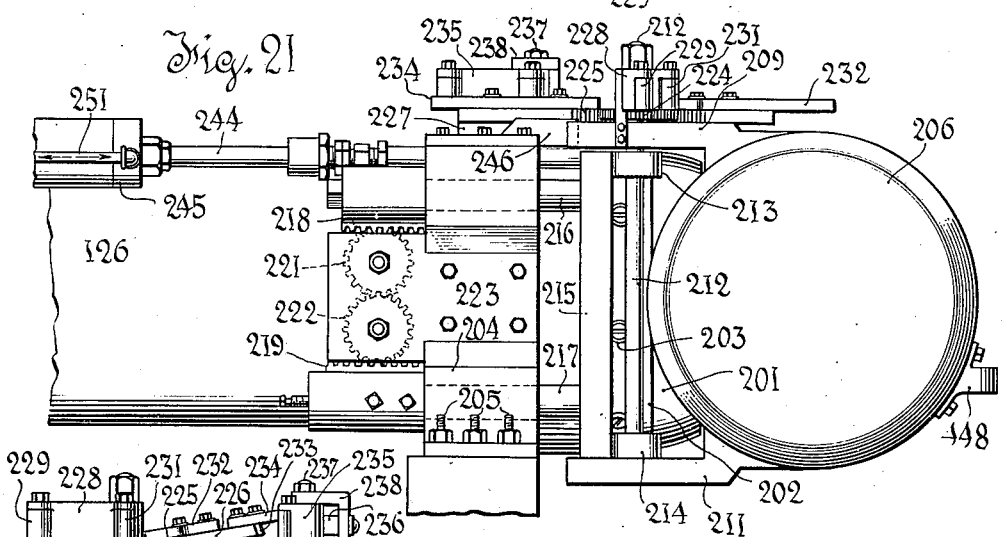
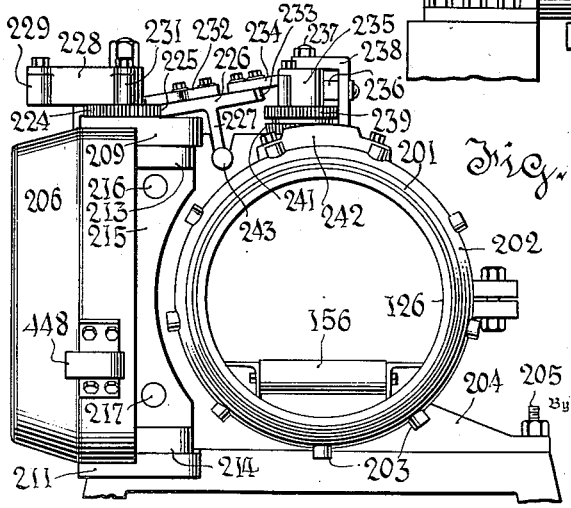
Inventors
Melvin E. Crowell
and Theodore W. Smith
Attorneys July 7, 1936.   M. E. CROWELL ET AL   2,046,549
APPARATUS FOR IMPREGNATING TIMBERS, TIES AND THE LIKE
Original Filed June 25, 1932   17 Sheets—Sheet 12
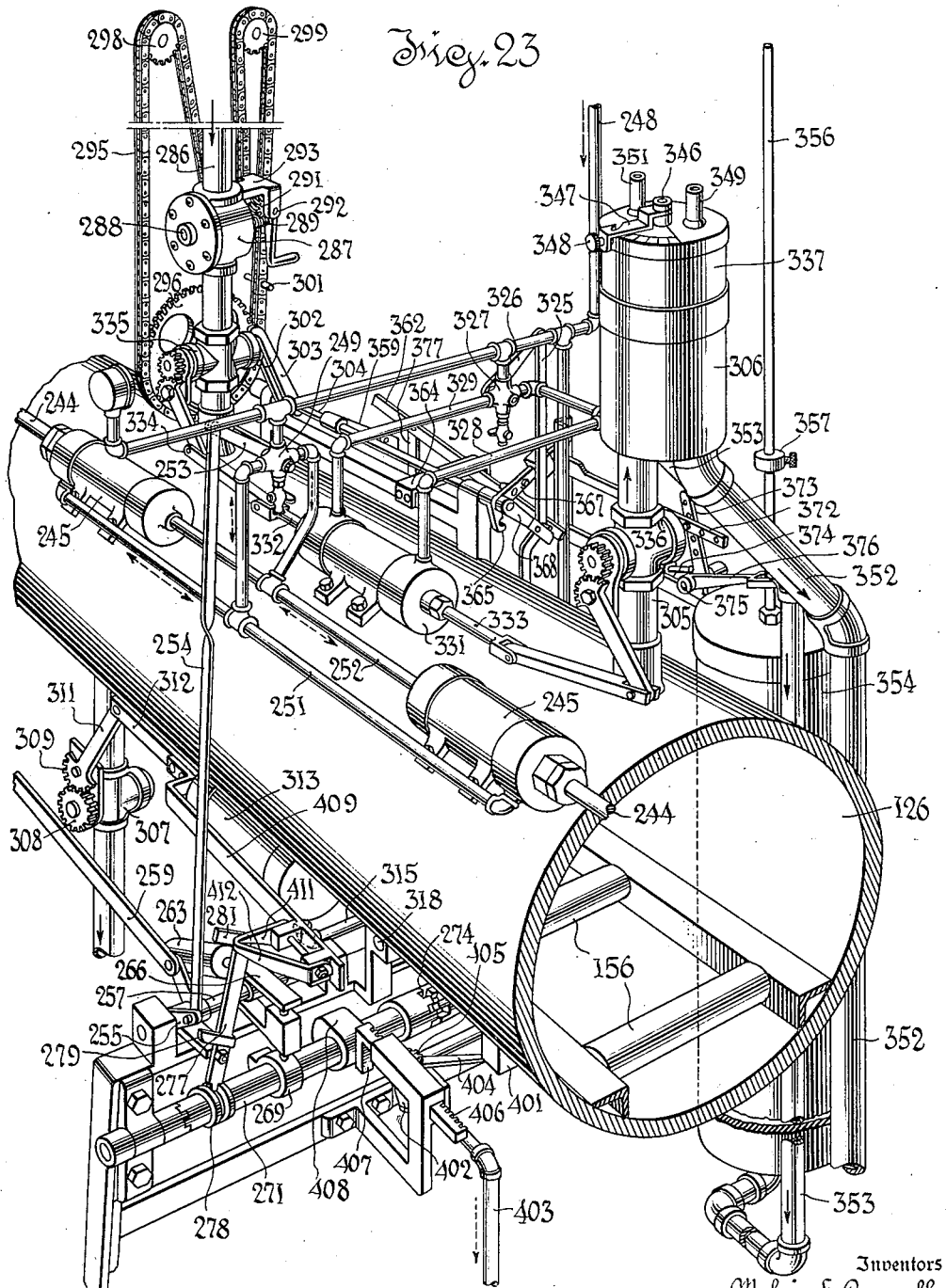

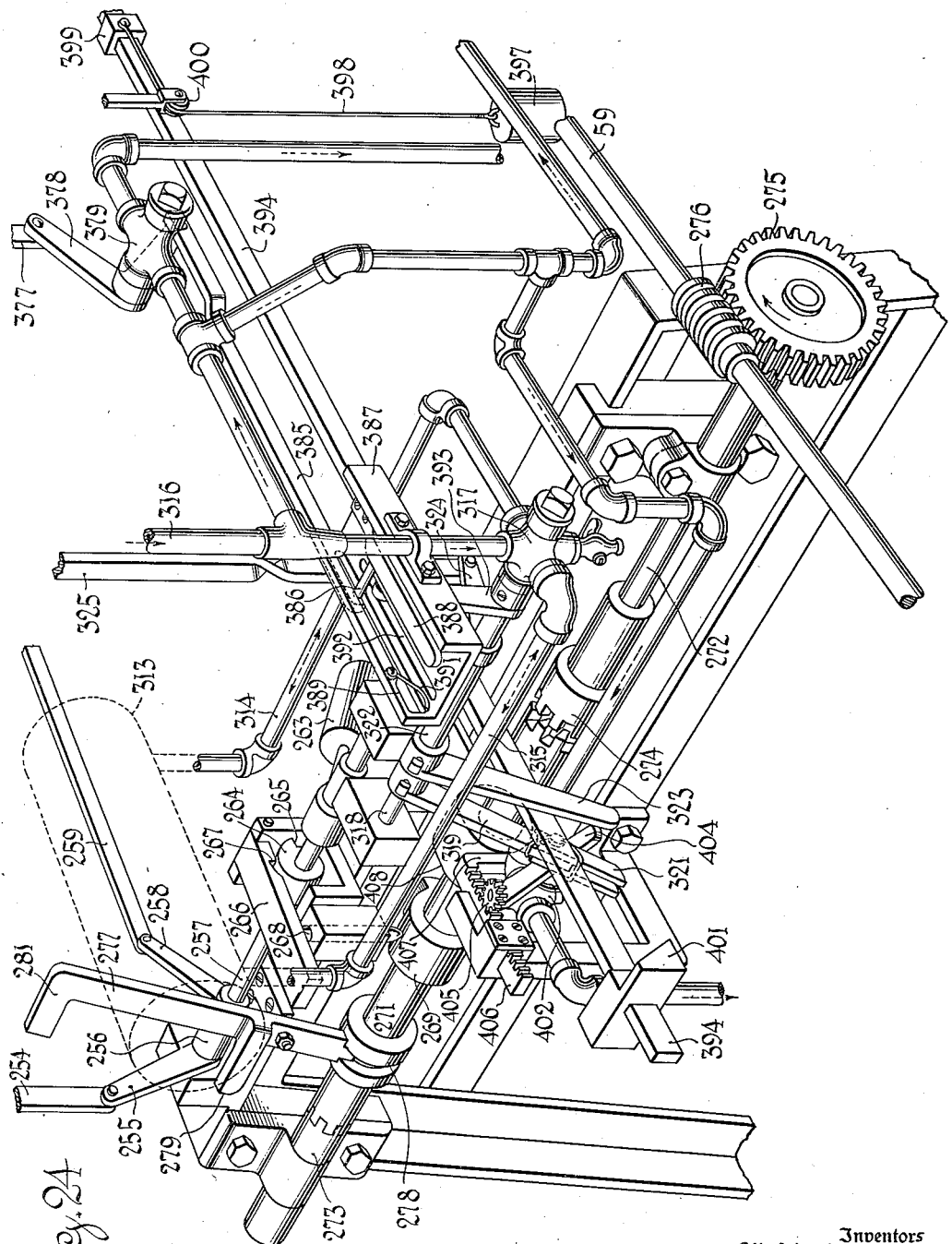

July 7, 1936. M. E. CROWELL ET AL 2,046,549
APPARATUS FOR IMPREGNATING TIMBERS, TIES AND THE LIKE
Original Filed June 25, 1932 17 Sheets-Sheet 14
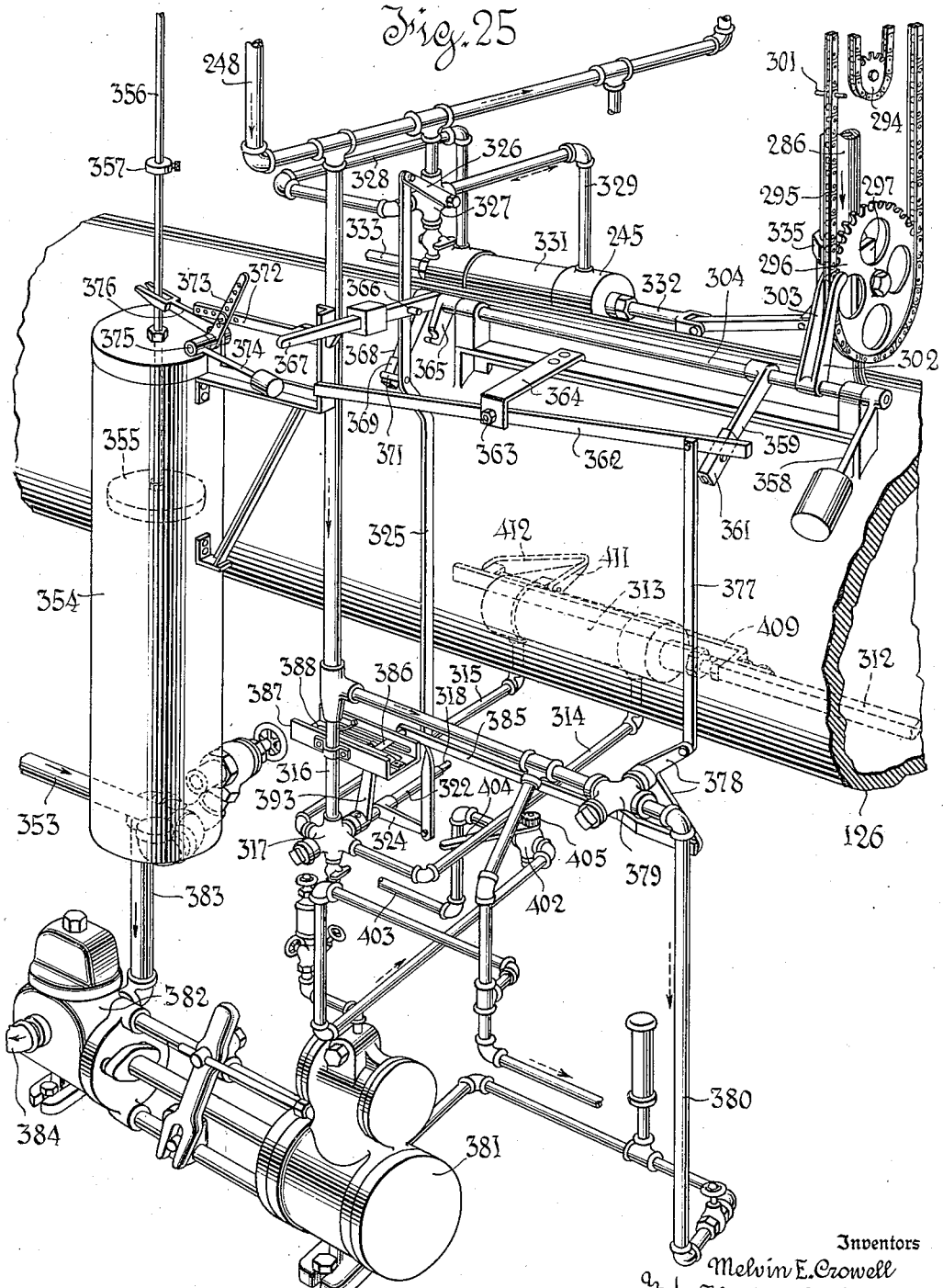
Fig. 25
Inventors
Melvin E. Crowell
and Theodore W. Smith
By 
Attorneys

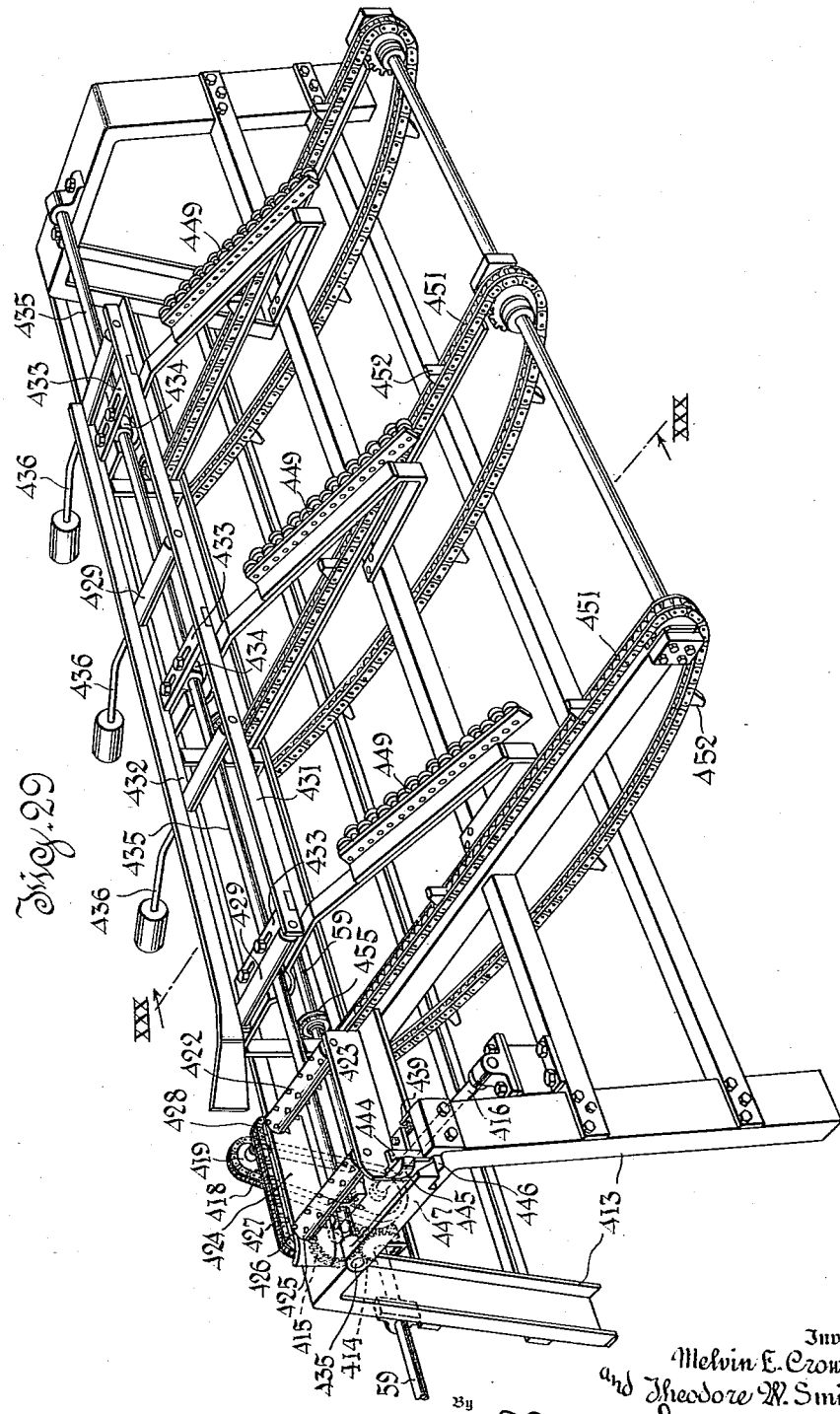

July 7, 1936.  M. E. CROWELL ET AL  2,046,549
APPARATUS FOR IMPREGNATING TIMBERS, TIES AND THE LIKE
Original Filed June 25, 1932  17 Sheets-Sheet 16
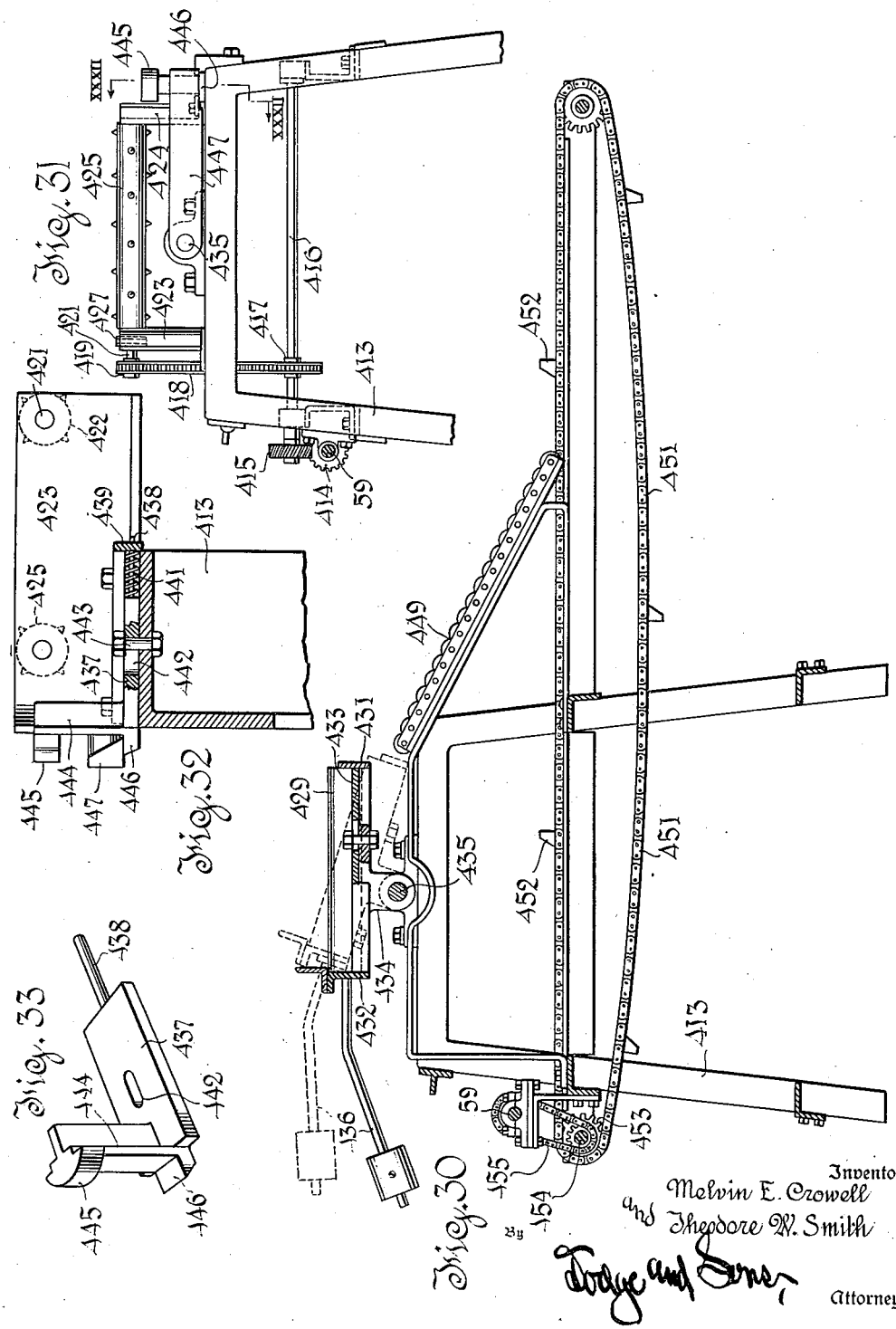
Inventors
Melvin E. Crowell
and Theodore W. Smith
By Dodge and Sons
Attorneys

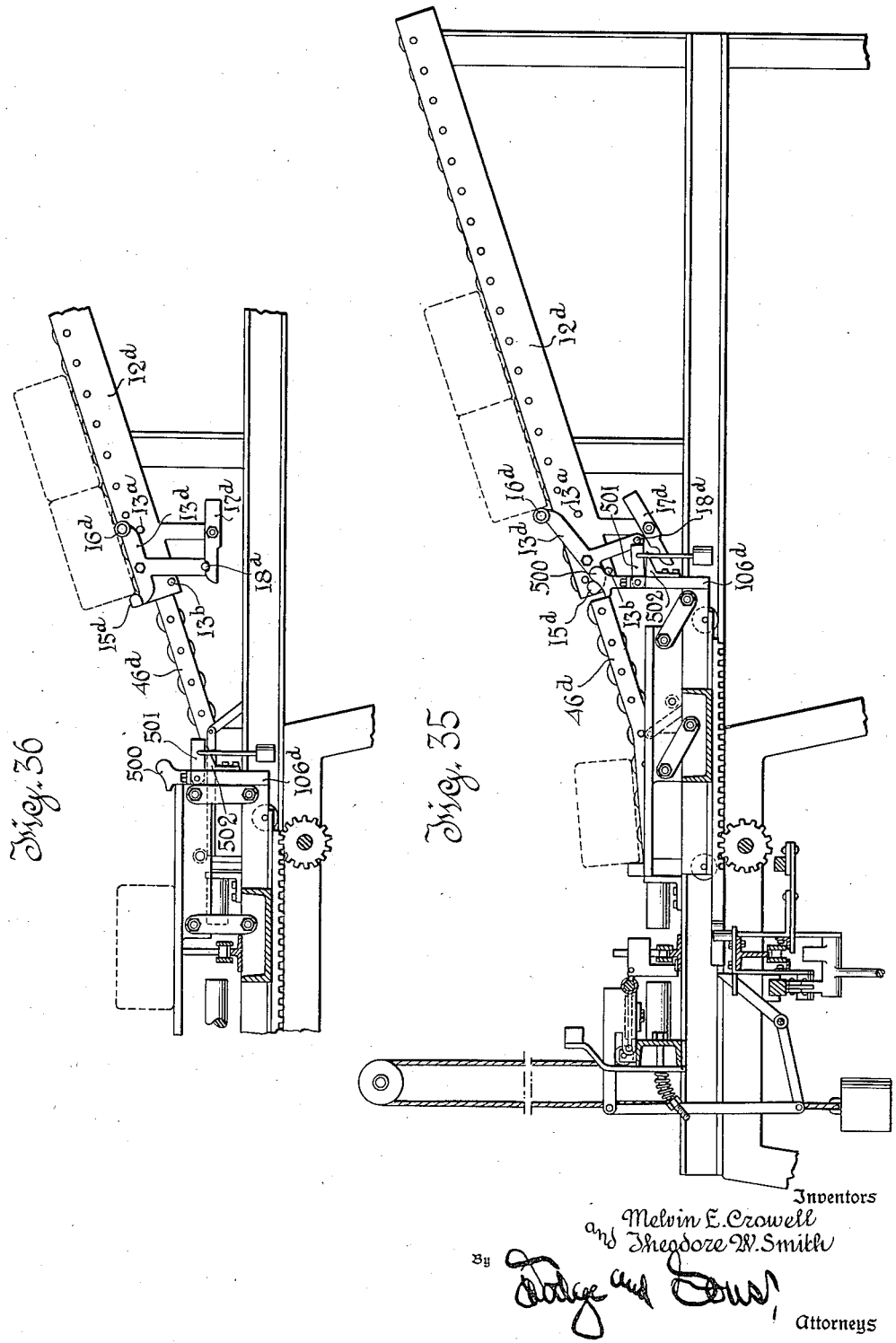

Patented July 7, 1936

2,046,549

UNITED STATES PATENT OFFICE 2,046,549

APPARATUS FOR IMPREGNATING TIMBERS, TIES, AND THE LIKE

Melvin E. Crowell, Franklin, and Theodore W. Smith, Indianapolis, Ind., assignors to Peter C. Reilly, Indianapolis, Ind.

Application June 25, 1932, Serial No. 619,343
Renewed December 6, 1935

22 Claims. (Cl. 21—12)

This invention pertains to an improved apparatus for automatically presenting timbers to, and removing the same from, a treating chamber where they are subjected to impregnation by the desired liquid.

The invention has for its main object the provision of means whereby the timbers, such for instance as railroad ties, will be automatically introduced into a treating cylinder and a given quantity of liquid forced into the timber, the apparatus being such that the cylinder closures are automatically opened and closed.

The invention also embodies certain details of structure whereby the parts are automatically operated in proper time and sequence and this preferably through a unitary source of power.

In a broad sense the apparatus may be said to comprise three inter-related units for effecting the desired operation, to wit:—a liquid measuring and forcing means associated with a treating unit in which latter the timber to be treated is placed; a charging unit which functions to convey the timbers, preferably one at a time, from the source of supply to the treating unit; and an off-take or receiving unit which handles the treated timber as it is discharged or removed from the treating unit.

A form of apparatus which has been found in actual operation to be effective for carrying out the invention as above broadly outlined is disclosed in the annexed drawings wherein:

Figure 1 is a plan view, more or less diagrammatic and with portions of the mechanisms omitted, showing the three inter-related units with the doors of the treating unit or cylinder in their open position;

Figure 2, a top plan view of the charging unit on an enlarged scale over that shown in Figure 1, said figure likewise showing a portion of one of the cylinder closing doors;

Figure 3, a vertical sectional view taken on the line III—III of Figure 2;

Figure 4, a similar view of the left hand portion of Figure 2 with the parts in such position that a tie or timber, as indicated in dotted lines, is about to be lowered upon the supporting rollers just prior to the transfer conveyor chain coming into operation;

Figure 5, a perspective view with parts broken away illustrative of a portion of the carriage employed to transfer the timber or tie from the upper to the lower skidway of the charging unit;

Figure 6, a similar view of the mechanism employed for securing reversal of travel of the transfer carriage employed in conjunction with the skidways;

Figure 7, a perspective view, with parts broken away, of a portion of the transfer carriage and allied parts illustrative of the mechanism, whereby the carriage is precluded from depositing a piece of timber or tie upon the lower skidway if the skidway happens to be occupied;

Figure 8, a transverse vertical sectional view taken on the line VIII—VIII of Figure 7 and showing the housing for the carriage driving chain and the locking mechanism employed to drive the chain first in one and then in the other direction;

Figure 9, a vertical sectional view taken on the line IX—IX of Figure 8 illustrative of the mechanism just referred to;

Figure 10, a perspective view of a portion of the carriage and the reversing mechanism employed in conjunction therewith and shown in Figures 8 and 9;

Figure 11, a detail plan view of the means employed for transferring the timber onto supporting rolls and over the transfer chain, which latter is employed to move the timber into the impregnating cylinder;

Figure 12, a perspective view of the same parts;

Figure 13, a perspective view of one end of the transfer mechanism illustrating that portion thereof which receives the tie or timber and moves it endwise into the treating cylinder Figure 14, a similar view of the right hand end of such mechanism, said view being in effect a continuation of Figure 13 with parts broken away and omitted;

Figure 15, a plan view of the parts shown in Figure 14;

Figure 16, a side elevation of the treating cylinders with the doors closed, together with the liquid and controlling means;

Figure 17, a top plan view, partly in section, of one end of the treating cylinder and the door or closure operating mechanism;

Figure 18, a side elevation of such parts as viewed from the lower side of Figure 17;

Figure 19, a vertical sectional view taken on the line XIX—XIX of Figure 18;

Figure 20, a top plan view of one end of the cylinder with parts broken away showing the door or closure in its open position;

Figure 21, a side elevation of the parts shown in Figure 20;

Figure 22, an end view looking into the cylinder, the door of course being in its open position;

Figure 23, a perspective view of a portion of the cylinder and various allied mechanisms employed to introduce and measure the impregnating liquid and various cylinders, the pistons whereof are actuated through compressed air to operate various parts;

Figure 24, a perspective view illustrating the actuating mechanism employed to open and close certain of the valves for controlling the flow of liquid to and from the impregnating cylinder and the air to and from various cylinders which actuate other valves;

Figure 25, a perspective view of a portion of the impregnating cylinder as viewed from the opposite side shown in Figure 23 and illustrating more particularly the pump employed for forcing a measured quantity of impregnating liquid which passes from the measured quantity receiving cylinder back into the impregnating cylinder;

Figure 26, a top plan view of the measuring weir employed in conjunction with the apparatus;

Figure 27, a similar view with the cover plate removed;

Figure 28, a vertical sectional view of the weir;

Figure 29, a perspective view of the offtake mechanism employed to receive the impregnated tie or timber as it is discharged from the impregnating cylinder after having been treated therein;

Figure 30, a transverse sectional view taken on the line XXX—XXX of Figure 29;

Figure 31, an end elevation of the discharge mechanism at that end next adjacent the impregnating cylinder;

Figure 32, a vertical sectional view taken on the line XXXII—XXXII of Figure 31;

Figure 33, a perspective view of a latch employed to hold the tilting platform of the timber receiving mechanism in its horizontal position;

Figure 34, an elevation of certain of the mechanisms;

Figure 35, a side elevation, partly in section, showing the feeding mechanism for the ties where the structure is employed in conjunction with a single treating cylinder only; and Figure 36, a similar view showing the parts in that position where a tie has been moved to a position where it may be advanced into the cylinder.

It is to be understood that the term "tie" hereinafter employed is intended to cover any piece of timber, log, or the like which is to be impregnated.

The impregnating liquid will hereinafter be referred to as oil and that term is to be considered in a generic sense.

Reference is made to Letters Patent granted to Peter C. Reilly as the assignee of T. W. Smith, Nos. 1,731,443 of October 15th, 1929 and 1,838,585 of September 29th, 1931 covering the process, the weir mechanism, and certain other allied parts, the method and the weir arrangement being the same as that shown in this case. As set forth in the process Patent 1,731,443, timbers taken from the same tree, as well as timbers taken from different trees, vary in physical characteristics and hence vary as to the amount of liquid which they will absorb or which may be forced into the same under the like or similar conditions. Thus, for instance, in the treatment of railroad ties a hard, solid or close grained tie will resist penetration of the impregnating liquid whereas a soft or spongy tie, and which is mechanically short lived, will not only readily receive the liquid but in some cases, as where the tie is thoroughly dry and warm, will have a tendency to absorb the liquid and this without the application of pressure upon the liquid. From this it will be seen that mechanically good and solid ties will not in the ordinary course of treatment take up the requisite amount of impregnating liquid whereas the physically poorer tie will take up more than a requisite amount for adequate protection.

Under the usual specifications as to the preservation of ties a given amount of preservative liquid, per cubic foot of wood, is required; it will therefore be seen that where a number of ties are impregnated at one and the same time,—or where the ties are individually treated and subject to the same treatment uniformity of impregnation does not obtain due to the physical differences of timber above mentioned. It is, of course, a waste of material to over impregnate a mechanically weak tie and it is likewise detrimental to the longevity of a structurally perfect tie not to sufficiently impregnate the same.

The apparatus as shown and described in the present case is designed to automatically effectuate the feeding of the ties, one at a time, to the impregnating cylinder; to automatically open and close the doors thereof; and to remove the last treated tie from the impregnating cylinder when there is no other tie present upon the tie presenting mechanism.

Means are also present for precluding the removal of a tie from the tie presenting carriage when the skidway located in front of the cylinder is already occupied by a previously positioned tie. The opening of the discharge door also cooperates with the tie receiving mechanism located at the discharge end of the impregnating cylinder to release a part of said tie receiving mechanism to effectuate a discharge of the tie therefrom.

Reference will first be made to the tie delivering mechanism. A suitable frame-work, denoted generally by 11 (see Figure 3), forms the support for a pair of inclined roller skidways 12 upon the upper end of which the ties are deposited. These skidways stand in spaced relation (see Figure 2) and a suitable arresting and releasing mechanism is employed to position the ties thereon and to release them one by one. This release mechanism is applied to each of the roller runways or skidways, at the inner face thereof and adjacent the lower portion (see more particularly Figures 3 and 5), and may be said to comprise a T-shaped lever 13 fulcrumed at 14. The lower discharge end of said lever projects upwardly and is rounded, as at 15, while the uppermost end carries a roller 16. The lever is normally locked in position by a gravitating latch 17, the forward end of which is rounded or beveled and is provided, to the rear of said rounded nose, with a seat or depression to receive a pin 18 extending outwardly over the lever or latch from the lower end of the depending arm of the T-shaped lever 13.

Suitable limiting stops 13ᵃ and 13ᵇ are secured to the skidway 12 and limit the swinging movement of the lever 13. (See more particularly Figures 3 and 5.)

Normally the latch 17 will maintain the position shown in Figure 5 and the end 15 will be held elevated so as to preclude a tie (see Fig. 3) from sliding down the skidways 12. The length between the projection 15 and the roller 16 is such as to preclude the upper end of the lever from rising when a tie overlies the roller 16. In other words, the rocking of the levers 13 allows the ties to slide forwardly, one at a time, onto suitable roller skids secured to a horizontally reciprocating carriage.

The reciprocating carriage may be said to comprise oppositely disposed side plates 19 and 19' rigidly connected by cross bars 21 and 22. Extending between and pivotally mounted in the side frames is a cross shaft 23 upon which are secured a pair of weighted levers 24, one standing in line with each of the pins 18 and the rounded nose of the latch 17.

At its opposite end each of the levers is provided with an outwardly projecting and upwardly inclined arm 25. The function of the weighted levers 24 is to release the latch 17 and hold the projection 15 of the lever 13 in its depressed position; this as the tie moves forwardly off of the skids 12 onto the skids mounted upon the carriage as above referred to.

Secured to bar 21 in line with the projection 15 on lever 13 are notched members 26, one for each of the levers. These members 26, coacting with the projections 15, serve to rock the lever 13 and cause it to tilt upwardly into the position shown in Fig. 5 as the carriage moves away from the skidway 12, thereby positively withdrawing the roller 16 out of contact with the adjacent tie.

As above noted, there are two skids mounted upon the reciprocating carriage and in line with the skidways 12. These skids are formed of two sections 27 and 28, the former being secured to the fixed bar 21. The member 28 is pivotally connected to the forward end of the member 27 and in turn is supported by a rocking cross bar 29. Each of the members 28 at its lower end is upturned and is provided with a roller 31. The bar 29 is provided at each end with a block 32, and extending outwardly and laterally from the upper portion to each of said blocks is a roller 33. These rollers rest upon and travel over tracks 34, one at each side of the main frame 11.

Each track is provided with a depressed portion 35 rounded at each end. Bridging this depressed portion is a fixed section 36, the upper face whereof lies in the same plane as the track 34.

As will be seen upon reference to Figures 3 and 5, the fixed portion 36 is shorter than the depression of the track and at its ends there are pivotally mounted gates 37 and 38 which, when lowered entirely, bridge the depression 35 and produce continuous trackways to each side of the machine.

Gate 37 is merely a gravitating one and will normally move to closed position in line with the main track 34 and the fixed portion 36. Gate 38, however, is designed to be elevated under certain operative conditions of the apparatus. To this end it is positively actuated to move in an upward direction or to the position shown in Figures 3, 5 and 6.

A shaft 39 is mounted for rotation in fixed hangers 41 and to each end of the shaft is secured a crank plate 42. A link 43, adjustable as to length, connects said plate 42 with the free end of the bridge 38. Weighted levers 44 serve to rotate the shaft 39 and to move the parts to the position shown in Figures 3 and 5. Also secured to shaft 39 are a plurality of arms 45, said arms extending upwardly and forwardly and above the upper ends of a third pair of skidways 46 which are fixed at their lower ends to a portion of the main frame 11. The upper end of each of the skidways 46 is provided with a roller 47 onto which the tie is deposited from the rocking skidways 28 as the carriage is moved rearwardly. Roller 47, as will be seen upon reference to Figure 3, underlies the arcuate section 35 of the trackway so that as the carriage is moved to the position shown in Figure 3 from the position it would occupy when advanced fully to the left the members 28 will pivot and deposit the tie then resting thereon to the upper section of the skidways 46.

The gates 38 will of course, prior to the displacement of the tie from the members 28 onto 46, be in their elevated position, hence the rollers 33 will pass downwardly from the level portion of the track 34 into the depression 35 thus permitting the rocking or tilting of the skid sections 28. The skids 46 are provided with suitable rollers to facilitate the passage of a tie thereover and against a fixed stop 48 located at the lower end of each of said skidways 46 where it comes to rest and is designed to be moved onto suitable supporting rollers preparatory to being moved into the treating cylinder.

In order to insure an even movement of the carriage which carries the transverse skids 27, 28 and their allied parts a shaft 49 mounted in the side members 19 and 19' carries pinions 51 which mesh with racks 52 secured to the adjacent fixed members 53 which form a part of the fixed frame 11.

To effect the necessary reciprocating movement of the carriage, which has mounted thereon the skids 27, 28 and which may be well termed the transfer carriage, the following or any equivalent means may be employed. Referring first to Figures 1 and 2, 54 denotes the motor which imparts motion to the various moving elements of the mechanism throughout the apparatus. It constantly rotates and imparts motion through a clutch 55 to a shaft 56 having secured thereto a worm 57 meshing with a worm gear 58 secured to a shaft 59. The shaft 59 has secured to it a sprocket 61 about which passes an endless sprocket chain 62, which chain also passes about a second sprocket secured to a shaft 64 (see Figure 7). Shaft 64 has secured to it a second sprocket 65 about which passes an endless sprocket chain 66, said chain, at the opposite end of the frame 11, passing about another sprocket 67. The chain moves constantly, so long as the power is on, in the direction indicated by the arrows in the various figures, and the upper and lower runs thereof are designed to be automatically locked to the carriage to cause it to be moved back and forth. Any suitable mechanism for accomplishing this end may be employed and the following has been found to be all sufficient.

Referring more particularly to Figures 7 to 10, both inclusive, there is illustrated a mechanism suitable for locking the carriage into operative relation with the drive chain 66 to bring about the necessary reciprocating movement.

Secured to the outer face of the side plate 19 of the carriage frame is a box-like element 68 which has openings formed in the forward and rear faces thereof through which the upper and lower runs of the chain 66 freely pass. Mounted for vertical reciprocation in the box is a locking element 69 which takes the form of a slide having its ends beveled at one side so that such ends may pass freely in between the pins which secure the links of the chain 66 together. The slide is of such length that only one end can be brought into engagement with one run of the chain at a time. It is shifted through a pinion 71 which meshes with a rack formed upon the locking element or slide 69, the pinion being secured to a shaft 72 which in turn has secured to it, outwardly of the member 68, an arm or lever 73, the latter at its free end being provided with a laterally positioned roller 74.

The roller 74 is designed to cooperate with the upper and lower faces of a cam bar 75 secured to an upstanding member 76 of the main frame.

As will be clearly seen upon reference to Figure 10, the cam bar 75 is beveled in opposite directions at each end so that the roller may readily shift from the upper to the lower face, as the case may be, and thus, through the rack and pinion connection, move the slide or locking element 69 up or down into engagement with the upper or lower run of the chain.

In order to insure the movement of the locking slide a spring actuated arm 77 is mounted adjacent one end of the cam bar 75 and tends to throw the arm 73 upwardly. When moving in the direction indicated by the arrow in Figure 6, the arm 77 is depressed, placing the spring 78, connected to its pivotal support, under stress hence as the roller reaches the end of the cam bar 75 it will be thrown upwardly and as a consequence the locking bar will be likewise raised to bring the upper end thereof into engagement with the upper run of the chain 66. Pivotally supported at the opposite end of the bar 75 is a second deflector element 79, the pivotal support whereof is associated with a spring 81, which, when the roller rides under the member 79, will place the spring under stress and tend to force the roller downwardly.

The member 79, as will be seen upon reference to Figure 6 is arcuate in outline and extends downwardly toward the fixed member 53 upon that side of the machine opposite from that viewed in Figure 5.

It is possible with the present construction, by merely extending the frame-work in front of a plurality of cylinders, to position a tie in front of each cylinder through the utilization of the carriage as shown and described and the same driving chain 66 would be employed therefor. It is to be understood that means for inserting the tie into any one cylinder, which means will be later described, would have to be present in front of each cylinder.

It would be essential, when the structure is to be employed with a battery of cylinders, to provide means whereby the carriage may traverse a distance greater than the length of the member 75, or in other words to provide means whereby a continuation of the member 75 over the length shown is provided, so as to permit the carriage to be moved the necessary distance before any shifting of the locking member 69 takes place. In Figure 6 there is shown a bar 75' with which there is associated a bridging element 82, which when turned down closes the gap between the members 75 and 75', allowing the roller 74 to move thereover and consequently maintaining the locking bar 69 in engagement with the upper run of the chain. There would, of course, be one of such additional bars, as 75', with the associated bridging element and other associated parts which will be referred to for operating the bridges for each cylinder in the series. So long as any one of the gates 82 is up the carriage will be caused to discharge the tie in front of the cylinder corresponding to the bars 75, 75' or the like. By curving the member 79 as shown in Figure 6 the roller 74 on the return movement of the carriage may ride thereunder.

The supporting shaft upon which the gate 82 is secured has attached to its opposite end a lever 83, the free end of which is interconnected through a link 84 to the upper end of a lever 85 which is fulcrumed at 86. The lower end of lever 85 is in turn pivotally connected to an arm 87 secured to a pin 88 extending outwardly from the crank plate 42 heretofore referred to. As a consequence, as the shaft 39 is actuated, the bridge 82 will be moved in consonance therewith, as will also the bridges 38.

A stop arm 89 extends upwardly through a slot formed in the member 53, the lower end of the arm being secured to a rod 91, which rod passes freely at its opposite end through one of the frame members. A compression spring 92 encircles the rod and tends to move the member 89 toward the bar 75. There is associated with the rod and member 89 an arm 93, which arm extends laterally into line with the upper end of the lever 85, and, as a consequence, when the bridge or gate 82 is closed the link 84 and the lever 85 will permit the spring to move the nose of the upstanding stop arm 89 toward the adjacent end of the cam bar 75 and form a stop which prevents the roller 74 from moving upwardly. At such time the member 69 is held free of engagement with chain 66.

The function of the stop arm 89 is to prevent duplicate delivery of ties to a single unit, or a plurality of units as the case may be, but at the same time to allow a tie to be positioned on the carriage 19 ready for delivery to any unit as soon as needed. There is but a single stop arm 89 whether there be a single or a plurality of cylinders but the rod 91 extends throughout the series with an arm 93 present thereon for each cylinder.

Where a plurality of cylinders are employed it is, of course, necessary, upon the reverse travel of the carriage toward the upper skids 12 to prevent the roller 74, and consequently the arm or lever 73, from moving upwardly between the spaced and adjacent ends of the members 75, 75', etc. To this end there is secured to the shaft 23, heretofore referred to (see more particularly Figure 7), an arm 94 to which is attached a link 95. The opposite end of the link 95 extends above and terminates adjacent the member 68 where it is pivotally connected to the upper end of a lever 96 fulcrumed upon a pin or shaft 97 supported in the side plate 19.

The lower end of the lever 96 stands in front of a pin 98 secured to and extending laterally from the lever 73. Thus as the carriage travels toward the skids 12 to receive a tie the weight upon the lever 24 will rock the shaft 23 in such direction as will hold the latch lever 96 against the pin and prevent the arm 73 from moving upwardly and consequently prevent the roller from passing inwardly between the adjacent ends of any two members 75, 75', et seq.

It will be appreciated, of course, that when the carriage is moved back to the position shown in Fig. 3 the placement of a tie upon the skidways 27, 28 of the carriage will depress the arms 25, rocking the shaft 23 counter-clockwise and thereby actuating the link 95 and releasing the latch lever 96 from the pin 98. Under these conditions the roller 74 may move upwardly past the end of the member 75, bringing the member 69 into engagement with the upper run of the chain 66 and thereby moving the carriage forwardly toward the skidways 46.

Through the operation of the parts as above specified, and assuming that but a single cylinder is being employed, it will be appreciated that a tie will have been moved forwardly by the tie transfer carriage and deposited upon the skidways 46 over which it passes and comes to rest against the fixed stops 48 of said skidways. It then overlies a carriage having what may be said to be an elevating platform which lifts the tie off the skids and transfers it laterally into line with the mechanism that is employed to move it into the treating cylinder. Said elevating and transfer carriage is best shown in Figs. 2, 3, 4, 11, 13 and 15. In this connection Figs. 11 and 15 may be looked upon as continuations one of the other so that the entire assembly will be seen on a larger scale in said figures than it is in Fig. 2 where it is shown as a whole in plan.

Secured to the frame-work 11 at opposite ends thereof are U-shaped channels 99, one at each end, with the open sides facing each other. The elements 99 form tracks and guideways for a movable carriage, the body whereof is composed of two L-shaped members 101 rigidly connected to each other by a transversely extending channel beam 102. Each of the members 101 (see Figures 3 and 4) is provided with a pair of rollers 103, 104 which bear upon the lower flange of the member 99 which forms a trackway therefor. At the rear end of each of the members 101 there is provided a filler block or bar 105 formed at its outer end with an upstanding lug 106.

Located above each of the members 101 is a lifter plate 107, there being a block 108 secured to the under face thereof adjacent its inner end. The plate 107 is supported in position by two pairs of spaced links, denoted generally by 109 and 111, pivotally connected to the filler block 105 and to the block 108. These links permit the lifter plates 107 to rise and fall, the stop 106 preventing the links from passing the vertical when the lifter plates 107 are moved to their fully elevated position. The raising and lowering movement of the plates 107 is effected, as the carriage is moved back and forth, by a pin 112 extending laterally from the block 108 and coacting with a suitable cam 113, pivotally connected at one end to the horizontal member 114 of an L-shaped element 115, the vertical flange whereof is rigidly affixed to the channel member 99. Thus in viewing Figure 13 it will be seen that as the carriage moves to the left the pin 112 will ride up the inclined camming surface 113 and as a consequence the lifter plate 107 will be elevated and maintained in its elevated position so long as the pin rests upon the fixed horizontal portion 114. The carriage also is moved to the left to such an extent that ultimately the pin 112 will pass off the left hand end of the member 114 permitting the plate 107 to move downwardly and the pin 112 to come to rest upon the upper face of the channel member 99. As the carriage is retracted or moved to the right the pin 112 will pass below the pivoted element 113, lifting the same until the pin comes to the position shown in Figure 13.

To actuate the carriage each of the elements 101 has secured to its under face a rack bar 116 which is in mesh with pinion 117 secured to a shaft 118. Oscillating movement is imparted to the shaft 118 through a pinion 119 (see more particularly Figure 12) secured to one end thereof and in mesh with a rack bar 121 attached to a piston working in an air cylinder 122. The means whereby the valve 123, which controls the input of air to and from opposite ends of the cylinder and thus causes a reciprocation of the rack 121, will be shortly described.

For the purpose of ease of identification the air lines and air cylinders, as shown in the drawings, will be indicated by dotted line arrows while the flow of the impregnating liquid will be indicated by solid line arrows.

A tie having been placed upon the lifter plates 107, and said plates having been lifted as the carriage moved laterally or to the left as shown in Figure 4, it will be seen that the log resting upon said plates is at that time immediately above a series of horizontally disposed rollers 124 and 125. The rollers 124 are in one series and are spaced away from the rollers 125 of the other series. In other words they are separated at their adjacent ends so as to provide a space for the tie moving mechanism that transfers the ties into the cylinder.

As the carriage reaches the outer end of its travel the pin 112 will pass off of the end of the guide 114, allowing the elevating plates or platforms 107 to drop. At such time the tie which is resting upon the plates is deposited upon rollers 124 and 125 and the carriage comes to rest with the members 107 in their lowermost position. The pin 112 is then in a position to ride beneath the pivoted member 113 when the carriage is moved rearwardly as it is upon a reversal of the air into the cylinder 122.

The tie which is resting upon the supporting rollers 124, 125 stands in line with the then open end of a cylinder 126 and a dual mechanism is employed for advancing the tie into the cylinder. The primary means may be said to comprise a chain 127 provided with an upstanding lug 128, the lug, as the chain is moved in the direction of the arrows in the various figures, contacting the rear end of the tie and moving it forward over the rollers. As will be seen upon reference to Figure 1, the lug would not move the tie fully into the impregating cylinder, hence a second means is employed to bring about complete insertion. Such mechanism is shown in its inoperative position in Figure 4 when the lug 128 will have free passage between the rollers and move the tie partially into the cylinder. In the remainder of the figures where such mechanism is shown the secondary means is in a turned down position where it is brought into alignment with the rear end of the tie in order that it may finish the movement of the tie into the cylinder. The actual pushing means is a rod 129 mounted in a tubular member 131 open at one side.

The tubular member 131 is secured to a series of rocking levers or elements 132 pivoted to blocks 133 secured to the upper face of a horizontally disposed flange of a U-beam 134 which forms a part of the frame-work of the machine.

As will be appreciated, when the tie is resting upon the elevating plates 107, or in the position shown in Figure 4, the rocker arms 132 and the tubular member 131 and rod 129 housed therein will be in the position shown in the said Figure 4. When however the tie has been advanced into the cylinder as far as it can be moved by the lug 128 levers 132 are rocked to a horizontal position so as to bring the rod 129, or more specifically the tooth on the laterally extending arm 130 (see Figures 14 and 15), into line with the rear of the tie.

Each of the members 132 has connected to it a link 135 which at its lower end is pivotally connected to a lever 136. The levers 136 are secured to a rock shaft 137, which shaft (see more particularly Figures 3, 4, 11 and 15) also has secured to it a pair of arms 138, one in line with each of the rack bars 116 heretofore referred to. The upper end of each of the arms 138 is beveled and as the tie is elevated and moved laterally above the rollers 124, 125, the projecting end of the rack bar (see more particularly Figures 11 and 13) contacts the upper end of said member 138 and tends to move the same and thereby to rock the shaft 137.

Normally the members 138 are held in the position shown in Figures 3 and 13 by a latch 139 formed as an integral portion of a sliding plate 141 (see Figures 3 and 4) secured to the upper face of a T-shaped beam 142 forming a part of the main frame structure. A spring 143 acts to hold the plate in such position that the nose of the latch 139 will engage the arm 138 and hold the parts in the position shown in Figure 13.

The plate 141 also carries an upstanding roller 144 designed to coact with a lug 145 formed upon the adjacent side face of the rack bar 116. It will thus be seen that as the rack bars are advanced the latches 139 will be withdrawn from locking engagement with the members 138 and said members will be free to be moved counter-clockwise. As the arms or levers 138 are moved counter-clockwise the shaft 137 is likewise moved in the same direction and through the connections above described the members 132 will be rocked and the slotted tube 131 and the rod 129 will be elevated.

In order to insure a return of the parts to carry the push rod downwardly to the rear of a tie there is provided (see Figures 3, 4 and 13) a lever 146 pivoted at its lower end to a member secured to the channel iron 134, said lever at its upper end being bent forwardly and being provided with a bearing block 147 which bears against the tubular member 131 when the same is moved upwardly to the position shown in Figure 4. The upper end of the lever, and consequently the block, is thrown forwardly or to the position shown in Figures 3 and 13 through the action of a coiled spring 148 which surrounds a threaded rod 149, one end of which is secured to the channel member 134, the rod extending freely through the lever which bears against one end of the spring. As will be seen, movement of the lever 146 from the position shown in Figure 3 to that shown in Figure 4 will place the spring under compression ready to throw the levers or members 132 and the parts attached thereto forwardly from the position shown in Figure 4 to that shown in Figure 3.

As the parts move from the position shown in Figure 4 to that of Figure 3, the tie having been advanced by the lug 128 to a position where the forward end of the push bar 129 may drop to the rear of the tie, the spring 148 will act to throw the members 131 and attached parts downwardly. The parts will then come to the position shown in Figures 3 and 13.

After the tie has been partially positioned within the treating cylinder by the lug 128, the lug passes out of contact with the end of the tie and is carried along by the lower run of the chain 127. As above noted, the push rod-carrying members are then dropped down to a position where the forward end of the push rod stands to the rear of the tie and is moved forwardly by a pin 151 extending laterally from the chain 127, the pin contacting the depending arm of an elbow shaped lever 152 which is fulcrumed on a plate 153 extending outwardly through the slot formed in the member 131 and secured to the push rod 129. The member 152 is normally held in the position shown in Figures 3 and 12 with reference to the other parts by a spring 154 and a stop pin 155, which latter contacts the under face of the member 153. The depending end of the member 152 stands to one side of the chain 127 and the lug or pin 151 comes into contact with said member when it reaches the upper run of the chain and moves forwardly with the chain toward the cylinder. This will cause the push rod 129 to move the tie into the cylinder and onto suitable rollers 156 located therein to receive the tie and upon which it has been partially positioned by the lug 128.

The parts are so proportioned that when the tie has been moved into the cylinder to the required and desired extent the depending arm of the member 152 will contact a cam 157 (see Figures 3 and 14) and swing the depending arm of the member 152 away from the lug or pin 151 thereby permitting the chain to pass forwardly with the lug or pin 151 free of contact with the depending arm of the member 152. Consequently the rod 129 will then cease to function as a pushing element. The rod is then drawn rearwardly into the tubular member. This is accomplished through a weight 158 attached to a cable 159, which latter is secured to the rear end of the rod and passes about suitable pulleys 161, 162 and 163 as shown in Figures 3, 11, 12 and 13.

As the lug 128 is carried along with the lower run of the chain 127 it will take against a lever 164 (Figures 2 and 15) fulcrumed to a fixed portion of the frame and connected by a link 165 to a sliding shifter bar 166. Said bar, as will be seen upon reference more particularly to Figure 12, is provided at one end with two spaced fingers 167 and 168 between which extends an arm 169 secured to an extension 171 of the spindle of the valve 123. A hand lever 172 may also be secured to the member 171 in order that the valve may be shifted by hand if so desired. It will, of course, be appreciated that the shifting of the valve 123 will cause the piston in the cylinder 122 to actuate the rack bar 121 and through the connections above described move the carriage which may be denoted the lifting and positioning carriage toward and from the tie-supporting rollers. The member 164 acts to position the valve to cause the carriage to move toward the chain.

Further along in the run of the chain there is provided a second lever 173 connected by a link 174 to the shifter bar 166 to cause the valve 123 to move to produce a reverse movement of the piston in the cylinder 122 and to move the carriage away from the chain.

The chain 127 passes about a sprocket wheel 175 (Figure 14) loosely mounted upon the shaft 56 which carries clutch members 176 and 177, the former being associated with the sprocket 175. The clutch element 177 is designed to be shifted into engagement with the other element and this is effected through the usual shifting means designated generally by 178 connected to a sliding rod 179. Said rod has secured to it a block 181 carrying a pin 182 which receives the forked end of a bell crank lever 183. Said lever has secured to it a vertically disposed shaft 184, the upper end of which finds its bearing in a bracket 185 secured to a fixed portion of the frame.

That end of the lever 183 opposite the forked end is secured to one end of a bar 186, and which may be termed the clutch actuating or shifting bar, said bar extending parallel to the lower run of the chain and adjacent thereto. Said bar has pivoted to the upper face thereof (see Figures 14 and 15) a lever 187 fulcrumed intermediate its length to a fixed element of the frame and pivotally connected at its upper end to a bar 188 which rests upon the upper face of the cross beam 99 and formed with an upstanding lug 189. This member 188 only comes into action to shift the clutch when the last tie, after being treated, is to be removed from the treating cylinder. This is effected as follows:

Inasmuch as there is no tie upon the rollers 124, 125 at this time the tubular member 131 and the supporting arms 132, together with the allied parts, will be in the position shown in all of the figures with the exception of Figure 4 and the lug 128 will then, as it is moved forward, contact the member 153, moving the pusher rod forwardly to substantially the full length of the upper run of the chain 127. This will project the pusher rod into the cylinder to such an extent as to remove the tie entirely from the cylinder and onto the tie-receiving mechanism later to be described. As the chain reaches the end of its movement to position the tie as just mentioned the depending arm of the lever 152 will contact the upstanding lug 189 and as the plate 188 is dragged forward will rock the lever 187 thereby actuating the clutch shifting bar 186 and throwing the clutch elements 176, 177 out of engagement. This frees the sprocket 175 so that it may turn in a reverse direction from that in which it has been driven allowing the chain 127 to run backward, the chain being drawn in such direction through the weight 158 acting on the pusher bar through cable 159. The clutch bar 186 may be provided with a handle 191 (Figures 11 and 12) whereby it may be manually manipulated.

It will of course be understood that during the operation of the machine, where a series of ties are being treated, the chain 127 moves forwardly in the direction of the arrow (Figures 2, 13 and 14) at stated intervals or periods and there is no reverse movement of the chain, as just mentioned, except and only when the final treated tie is to be ejected from the treating cylinder.

To bring about the periodic stopping of the driving chain 127 the following mechanism may be employed (see more particularly Figures 3, 4 and 13):

Extending downwardly from the under face of the clutch-shifting bar 186 is a lug or projection 192. Said lug stands in alignment with the pivoted nose 193 of a bell crank lever 194 fulcrumed to a fixed portion of the machine. The opposite end of the lever is connected by a link 195 to an arm 196 of a second bell crank lever, the opposite arm of which is offset and denoted by 197. A weighted lever 198 is secured to the hub of the second bell crank and normally holds the parts in the position shown in Figure 13. Arm 197 stands beneath the lower run of the chain and in the path of the lug 128 so that as the lug comes into contact therewith and is moved along by the chain it will rock the elbow lever, drawing down upon the link 195 and causing the pivoted nose 193 to move in front of the lug 192. As the lug 128 rides off of the arm 197 the weighted arm 198 will cause the parts above described to function and to shift the clutch bar 186 and disengage the clutch, thus bringing the chain to rest.

Let it now be assumed that a tie has been properly positioned in the treating cylinder 126. It becomes necessary to close the cylinder doors and to cause a flow of oil into the cylinder in an amount equal to the cubical capacity thereof, which oil will, by reason of the presence of the tie in the cylinder, be caused to flow out in a quantity equal to the cubical content of the tie. The outflowing oil passes through a weir which segregates a fixed quantity to be returned to the cylinder and ultimately forced into the tie.

Each of the doors at the ends of the cylinder 126 and the operating mechanism therefor is identical, hence the description of one will apply to the other as well. The cylinder, at its end, is provided with a fixed beveled retaining ring 201, inward of which and on the outer surface of the cylinder is a rotatable locking ring 202 provided with a series of outwardly projecting lugs 203.

The cylinder is supported at each end by suitable standards 204, the standards being provided with circular openings and split at one side. The reduced portion of each end of the cylinder extends into the opening formed in the adjacent standard and the standards are clamped to the cylinder by a series of bolts 205. The standards, along with the encircling rings 201 form guideways for the respective locking rings 202.

As will be seen upon reference to Figures 17 and 20, the outer face of each of the locking rings 202 is slightly beveled adjacent the retaining rings 201. In other words the ring 201 and the outer portion of the ring 202 are beveled or inclined so that when the door, denoted generally by 206, is drawn upwardly thereon it will make a relatively close fit therewith. The door 206 is cap-shaped in cross section and the inner face of the flange portion is provided with bayonet slots 207 designed to coact with the pins 203 to draw the door closely against the end of the cylinder when the ring 202 is rotated and the pin moved into the inner curved portion of the slots. Any suitable packing, as 208, may be mounted in the door to abut the end of the cylinder and the outer edge of the retaining ring 201.

The door 206 is provided with laterally extending spaced arms 209 and 211 (see more particularly Figure 21), through which extends a hinge pin or shaft 212. This shaft likewise passes through ears 213 and 214 extending outwardly from a casting 215. Extending inwardly from the casting 215, and in parallel spaced relation, are two supporting bars or rods 216 and 217. The member 215, together with the ears or lugs 213 and 214 and the rods 216 and 217, forms a movable supporting frame to which the door is hinged.

The bars 216 and 217 extend through suitable openings or bearings formed in the standard 204 to one side of the cylinder. Bar 216, at its rear end and to the rear of the bearing, has secured to it a rack 218 while the lower bar 217 has secured to it a similar rack 219. The racks 218 and 219 mesh respectively with a pair of intermeshing pinions 221 and 222 mounted upon a plate 223 secured to the adjacent face of the housing of the support 204. By the use of the racks and pinion a right line movement of the member 215, the shaft 212, and the door which is supported thereby is insured so that the door, when swung around in line with the end of the cylinder, will have the slots 207 in direct and accurate registry with the pins 203 and allow an inward movement of the door, in a right line direction, prior to the turning of the locking ring 202 to bring the door into close relation with the end of the cylinder through the action of the bayonet slots.

To bring about the swinging movement of the door, both in opening and closing, to effectuate the movement of the door in its right line movement toward and from the end of the cylinder and to actuate the locking ring 202, both in its locking and releasing movements, the following mechanism may be employed:

Secured to the upper portion of the shaft 212 is a pinion 224 which is engaged at certain times by a rack 225 formed at one edge of a plate 226, which plate is provided on its under face with a downwardly projecting rib 227. The lower edge of the rib 227 is rounded and finds its bearing in a socket formed in the cylinder support 204.

Shaft 212 also has secured to its upper end an L-shaped arm or lever 228 in the longer outer end of which there is mounted a roller 229. The shorter end of this lever is of a length substantially equal to the radius of the pinion 224 and is likewise provided at its outer end with a roller 231. Plate 226 at its forward end and adjacent the parts just described has adjustably secured to it a plate 232 designed to coact with the roller 229 as the shaft 212 is rotated to rock the plate 226 laterally.

The plate 226 is provided with a rack 233 opposite the rack 225 and likewise has adjustably secured to its inner portion a bearing plate 234. The edge of said plate stands in line with a roller carried in the outer end of an arm or lever 235 normally held in engagement with the edge of the plate by a spring 236. The arm 235 is mounted upon a shaft 237 which finds its bearing in a bracket 238 and in the supporting element or member 204. Shaft 237 has secured to it two pinions 239 and 241 (see more particularly Figures 19 and 22). The uppermost pinion 239 is designed to coact with the rack 233 when the plate 226 is rocked laterally or to the position in Figures 17 and 19.

Pinion 241 is at all times in mesh with a circular rack 242 secured to the locking ring 202 and serves to oscillate said ring about the end of the cylinder. The rounded portion 243 formed at the lower portion of the rib 227 is interconnected with the piston rod 244 extending from an air cylinder 245. As will be seen upon reference more particularly to Figure 20, when the piston rod 244 is moved inwardly the rack 225, acting through the pinion 224, will rotate shaft 212 counter-clockwise and, through the arms 209 and 211, which are likewise secured to the shaft, the door 206 will be thrown around in line with the open end of the cylinder. At such time the roller 231 on the arm 228 will contact a shoulder 230 on the member 232 and as a consequence the door-supporting elements are moved inwardly as a whole, causing the outer ends of the slots 207 to pass over the pins 203. Continued movement of the shaft 212 when the parts are thus positioned causes the arm 228 to swing around and bring roller 229 into contact with the member 232 and shift the member 226, this operation taking place simultaneously with the engagement of the rack 233 with the pinion 239 which brings about rotation of the ring 202 through the driving of the pinion 241 and the circular rack 242. As a consequence the pins are caused to move inwardly of the bayonet slots 207 and draw the packing ring 208 tightly against the end of the cylinder.

In the opening of the door the plate 234 functions with the spring pressed arm 235 in a manner similar to the functioning of the arm 228 with reference to the plate 232 and rocks the member 226 so as to free the rack 233 from engagement with the pinion 239 after the ring 202 has been rotated to move the pins out of the inclined portions of the slots 207. When the member 226 is shifted it of course brings the rack 225 into engagement with the pinion 224 so that the door-supporting mechanism may be moved outwardly prior to the door being swung about its pivot to a fully open position.

To insure absolute right line movement of the door as the pins begin to enter the slots 207 a locking and guiding bar 246 is provided. Said bar is secured to the upper portion of the element 204 and enters a slot 247 formed in the member 209, parallel to the axis of the door or closure 206. It follows, therefore, that when the door is swung around so that its axis is in line with the axis of the cylinder the fixed member 246 will stand in line with the slot 247 and, as the door is moved inwardly into engagement with the pins 203, it must move in a right line. The supporting elements for the door, as heretofore described, also function to properly position the same with reference to the end of the cylinder prior to its being locked in position.

It will be understood, of course, that the door closing and locking mechanism is present at each end of the cylinder and as a consequence there will be an air cylinder 245 (see Figures 16 and 23) to actuate each of the closures.

An air line 248, leading from a suitable compressor (not shown), extends to a valve 249 which controls the inlet and exhaust of air through pipes 251 and 252, respectively, to the cylinders 245. The valve 249 is operated in timed relation with the tie positioning and discharging means. To this end the valve spindle has secured thereto a lever 253, the outer end of which is pivotally attached to a link or a draw bar 254, which at its lower end is pivotally attached to a lever 255 extending outwardly from a hub 256 secured to a rock shaft 257 (see more particularly Figure 24). A second arm or lever 258 extends outwardly from the hub 256 and is angularly displaced with reference to the arm 255. A bar or link 259 is connected at one end to the arm or lever 258 and at its opposite end (see Figures 14 and 15) is swiveled to one end of the lever 261 fulcrumed at 262 to a fixed element of the machine frame. The opposite end of the lever 261 underlies the lower run of the chain 127 and is shifted by the lug 128 when the chain is moved in its usual direction. It will thus be seen that as the lug contacts the free end of this lever it will actuate the bar 259 and through the connections heretofore described will rock 257 and through the draw bar 254 will actuate the valve 249. The parts are of course so related that the lever 261 is brought into action at the proper time intervals.

Shaft 257 (see more particularly Figure 24) is normally held in the position shown in said figure by a counterweight 263 secured to an arm extending outwardly from the shaft.

Shaft 257 also has secured to it a cam 264 provided with a locking shoulder 265. The cam underlies a gravitating block or element 266 which on its under face is formed with a locking shoulder 267 adapted, when the shaft 257 is rotated to be brought into interlocking relation with the face 265 of the cam. Underlying the outer free end of the member 266 is a vertically disposed pin 268, the lower end whereof rides upon a cam 269 secured to a tubular element 271 mounted for sliding movement upon a shaft 272. The sliding member 271 is in effect a portion of a clutch having teeth at opposite ends thereof. At the left hand end, as viewed in Figure 24, the teeth upon said member engage complemental teeth formed upon a fixed element 273. At its opposite end the teeth engage the teeth of another toothed member 274 secured to the shaft 272. Thus when the parts are in the position shown in Figure 24 the member 271 is held at rest. When shifted laterally, or to the right, the element 274 is locked thereto and the member 271 is driven inasmuch as the shaft 272 is constantly rotated through worm wheel 275 secured to shaft 272. Said wheel 275 is in mesh with a worm 276 secured to the constantly driven shaft 59. To shift the member 271 to engage and disengage the clutch member 274 a lever 277 is employed, the lower end of the lever extending into a shipper collar 278 while the upper end is provided, above its pivot, with two laterally extending arms 279 and 281 respectively. The function and operation of the arms 279 and 281 in connection with the opening and closing mechanism of the air valve 249 will be hereinafter set forth.

When the doors are actuated it is designed to have one of the doors, or that next adjacent the tie inserting means, function to operate the clutch elements 176 and 177. To that end the door to which reference has just been made is provided with an outwardly projecting lug 282 (see Figs. 2 and 17). When the door reaches its fully open position the lug will contact an upstanding stud or arm 283 (see Figs. 14 and 15) which is secured to a lever 284. Said lever is interconnected to a shaft 184 through a clutch 184ᵃ (see Fig. 34), a coil spring 285, which encircles the upper portion of the shaft, serving to hold the clutch elements in engagement. When the cylinder door 206 is opened the lug 282 will contact the arm 283, causing the lever 284 to operate the shaft 184 and, as a consequence, will, through the connections before described, bring the clutch elements 176 and 177 into engagement, thereby actuating the chain 127 to advance the tie into the then open cylinder. When the door is closed the lug 282 thereon will again contact the stud 283 but the ratchet teeth will slide over each other and the arm 284 will therefore not impart any motion to the shaft 184.

Let it now be assumed that a tie has been placed in the treating cylinder, both of the doors closed preparatory to the introduction of the oil into the cylinder and the drain valve hereinafter to be referred to likewise closed. At such time the oil meter, the weir and the allied mechanisms are brought into operation to insure the desired and requisite amount of oil being segregated or measured and forced back into the cylinder and consequently into the tie prior to the discharge of the same from the treating cylinder.

Means is also provided in the presence of a drain valve to drain the cylinder prior to the opening of the doors, preferably along with a valve through which air under pressure may be introduced into the treating cylinder to assist in the draining thereof.

The oil supply is connected to the apparatus through a pipe 286, the supply being subject to air pressure, the pipe opening into a meter 287 (see more particularly Figures 16, 23 and 25).

The meter may be of any standard type and the shaft 288 thereof has secured to it a worm 289 which meshes with a worm wheel 291 carried by a shaft 292 mounted in a bracket 293. The shaft 292 at its other end has secured to it a small sprocket wheel 294 about the lower side of which passes a downwardly extending loop portion of an endless sprocket chain 295, the lower loop of the chain passing about a large sprocket 296 supported upon a pin extending outwardly from a bracket 297. A pair of small idler sprockets 298 and 299 (Figure 23) are located above the small sprocket 294 about which the chain likewise passes.

A pin 301 extends outwardly from each side of the chain 295 and is designed to contact a pair of spaced levers 302 and 303 secured to a rack shaft 304 (see more particularly Figure 25). The function of the arms and shaft will be hereinafter set forth.

As above noted, the quantity of oil introduced into the cylinder after the tie is placed therein and the doors closed is equal in amount to that of the cubical capacity of the cylinder. As a consequence it is designed to have the chain 295 move through one complete cycle so as to position the pin 301 in proper relation to the arms 302 and 303. It will be understood that a quantity of the oil equal to the cubical content of the tie will pass outwardly from the cylinder, as through a pipe 305, into a weir 306.

It will, of course, be understood that prior to the introduction of the oil into the treating cylinder 126 a drain valve 307 opening into the lower portion of the cylinder will be closed. (The valve in the position of the parts shown in Figure 23 is open.) The valve spindle has secured to it a pinion 308 which is in mesh with a sector-shaped rack 309 from which extends a lever 311. Said lever, at its upper end, is connected to an extension 312 of a piston rod extending from the cylinder 313. Air is admitted to and exhausted from the opposite ends of the cylinder 313 through pipes 314 and 315 (see more particularly Figure 24), the pipes being interconnected to an air line 316 through a valve 317. The stem or spindle 318 of the valve is an extended one and has secured to it an arm or lever 319 provided with a pivoted nose 321.

There is also mounted upon the extended valve spindle 318 a sleeve 322 to which is secured an arm 323 adjacent the arm 319. A second arm 324 is secured to the sleeve and the outer end of the arm is pivotally connected to the lower end for an upwardly extending link 325 (see Figure 25) which in turn is pivotally connected to an arm 326 attached to the spindle of an air control valve 327.

The valve 327 controls the inlet of air through pipes 328 and 329 which lead to the opposite ends of a cylinder 331. The piston within the cylinder is provided with oppositely extending piston rods 332 and 333. The rod 332 is connected by a link 334 to suitable operating mechanism for opening and closing a valve 335 located in the feed pipe 286 connected into the treating cylinder 126 as above described.

Pipe 305 which extends to the weir 306 has a valve 336 located therein, said valve being opened and closed through suitable mechanism connected with the piston rod 333.

The valves 335 and 336 are designed to be opened and closed simultaneously, hence a single cylinder is all that is necessary to bring about the desired result. So too the valve 307 is closed at the same time the valves 335 and 336 are opened.

As set forth in the patents above referred to, the weir shown in detail in Figures 23, 26, 27 and 28 is designed to segregate a predetermined quantity of the excess oil or liquid which passes from the treating cylinder due to the replacement of such oil by the tie then within the cylinder. The weir may be said to comprise a cylindrical body 337, the lower end of which is closed except for certain ports which enter the same. Extending upwardly from the bottom 338 of the weir is a vertically disposed partition 339 and extending outwardly to the opposite sides of the inner wall of the cylindrical body 337 are two partitions 341 and 342. Partition 339 extends to the full height of the body whereas the partitions 341 and 342 are lower. These three partitions form three chambers within the weir, to wit:—an inlet chamber with which the pipe 305 communicates and a measuring and discharge chamber into which discharge ports 343 and 344 open. Mounted within the inlet chamber of the weir is a blade or plate 345, the innermost edge whereof is rounded and fits into a rounded recess formed in the vertical inner edge of the partition 339. This rounded portion of the blade extends upwardly, as at 346, through the cover of the weir and has attached to its upper end a laterally extending indicator finger 347, the outermost end whereof is bent downwardly and carries a locking screw 348. The face of the cover below the indicator finger 347 is graduated so as to show the position of the blade or vane 345 with reference to the inlet chamber and consequently to indicate the proportionate flow of the liquid from the inlet chamber to the outlet chambers from which the ports 343 and 344 extend. Vent pipes 349 and 351 are mounted in the cover to prevent the weir from becoming trapped or air bound. The port 343 is connected with a pipe 352 that leads back to the storage tank (not shown). Port 344 is interconnected through a pipe 353 with a tank 354. Consequently the quantity of material with which it is desired to impregnate the tie will be segregated by this weir and passed into the tank 354 from which it will be forced back into the impregnating cylinder 126 when the valves 335 and 336 are both closed.

Mounted within the tank 354 is a float 355 and connected thereto is an upwardly extending rod 356 which passes freely through a bushing mounted in the upper end of the tank. The rod 356 has adjustably secured thereto a collar 357, the function of which will presently appear.

Shaft 304 heretofore referred to (see more particularly Figure 25), has secured to it, in addition to the arms 302 and 303, a weighted arm 358 which acts normally to rock the shaft counterclockwise, the weight coming to rest against the treating cylinder. Consequently the cylinder acts as a stop therefor. A lever 359 having a pivoted nose 361 is secured to the shaft 304, the nose standing in line with a lever 362 fulcrumed at 363 upon a bracket 364.

Shaft 304 also has secured to it an arm 365, the upper face whereof is notched and which is designed under certain circumstances to receive a pin 366 extending outwardly from a weighted lever 367 fulcrumed upon the shaft 304. Adjacent the free weighted arm 367 there is secured to the shaft 304 another lever 368 provided with a pivoted nose 369, the latter standing in line with a pin 371 extending laterally from the link 325 heretofore referred to. The link 325, as heretofore mentioned, opens and closes the valve 327 and the lever 368 and the pivoted nose 369 tend to actuate the link 325 in a downward direction in opposition to the movement of the member 324 heretofore referred to.

Weighted lever 367 cooperates with a reciprocating latch bar 372, the under face of the latch being beveled so that the lever may be raised upwardly to the position shown in Figure 25, and moving the latch inwardly. The latch is normally moved outwardly through the action of a lever 373 which is adjustably attached to the latch through the action of a weighted arm 374 secured to a shaft 375 and to which the arm 373 is also secured. Shaft 375 likewise has secured to it a forked arm 376, the fingers whereof straddle the float rod 356 heretofore referred to.

As will be readily appreciated, when the float 355 falls the collar 357 will contact the fingers of the member 376 and as a consequence will withdraw the latch, through the connections just mentioned, from beneath the lever 367 and permit the same to drop.

Secured to one end of lever 362 is a link 377 which at its lower end is pivotally connected to one arm of an elbow lever 378 secured to the spindle of an air control valve 379. Said valve controls the inlet of air through the line 380 under pressure to the air cylinder 381 which actuates the oil transfer pump 382. Said pump is interconnected with the tank 354 through an off-take pipe 383 (see Figure 16), there being a pipe 384 extending from the outlet of the pump and opening into the treating cylinder 126.

The force pump for the oil comes into operation only when the full metered charge has been passed into the treating cylinder and it is desired to reintroduce the segregated or measured portion of the oil back into the treating cylinder from the reservoir 354.

Interconnected with the second arm of the elbow lever 378 is a link 385 (see Figures 24 and 25), said link at its opposite end carrying a laterally extending pin 386, the pin passing through a slot formed in one of the upstanding side walls of a fixed trough-shaped element 387. The pin, at its inner end, normally rides under an overlying hold-down finger 388. The slot through which the pin extends is enlarged at one end, as at 389, and a spring finger 391 is secured to the inner wall of the member 388 adjacent said enlarged portion and acts to force the pin 386 downwardly. The member 387 is also provided in its base with a longitudinally disposed slot or opening 392 into and through which extends the upper rounded end of an arm or lever 393 secured to the valve spindle 318. The angular disposition of the arm 393 with reference to the spindle, together with the length of the arm, permits it to function with the pin 386 in a manner to be described later.

Extending longitudinally of the apparatus and between the levers or arms 319 and 323 is a draw bar 394 (see Figures 2, 11, 15, 16 and 24). As will be seen upon reference more particularly to Figure 11, the bar is pivotally connected to a lever 395 which in turn is pivotally connected at 396 to a fixed portion of the machine, the lever 395 at its free end extending beneath the lower run of the chain 127 and designed to be moved by contact with the lug 128 as the lug is carried along the lower run of the chain.

When the lug passes off of the lever 395 the draw bar 394 is moved in the opposite direction through the action of a weight 397 secured by a cable 398 attached to the bar 394 through a block 399, the cable passing over a pulley 400 secured to a fixed element of the machine.

Upon that end of the bar 394 adjacent the arms 319 and 323 there is secured a block 401 designed to cooperate with the arms 319 and 323. As the bar is moved to the right (Figure 24) it will contact the arms and rotate the extended valve spindle 318 counter-clockwise. This will reverse the position of the valve 317 and permit air to pass through pipe 315 to actuate the drain valve 307.

Arm 393 will of course be moved to the left in Figure 24. Arm 324, which is secured to the sleeve 322, will be moved upwardly and through the link 325 will move the valve 327, permitting air to pass through pipe 328 into the cylinder 331 to open valves 335 and 336. This, of course, permits the filling of the treating cylinder 126 with oil and the measurement of the desired quantity thereof which passes into the reservoir 354. When the requisite amount of oil has passed through the charging cylinder and the desired quantity segregated, pin 301 will come into contact with the arms 302, 323 and move the same downwardly, rocking shaft 304 clockwise, as viewed in Figure 25, raising the weighted arm 358 and at the same time carrying the other arms secured to the shaft upwardly. Nose 361 permits the arm 359 to freely pass the end of the lever 362. Nose 369 likewise passes the pin 371 without any movement of the said pin.

Arm 365 is moved upwardly and the pin 366 passes into the notch formed in the upper face thereof, carrying the weighted lever 367 upwardly to beyond the nose of the latch bar 372, permitting the bar to come to rest thereon.

Continued movement of the chain 295 permits the pin 301 to ride off of the arms 302, 303 and as a consequence the weight will rotate the shaft 304 counter-clockwise (Figure 25) and the nose 361 will thereupon contact the lever 362 and rock the lever, pushing the connecting link 377 downwardly and actuating the valve 379 thereby starting up the pump 381.

As the oil is drawn from the tank 354 collar 357 will contact the arm 376 and, through the connections heretofore described, will withdraw the latch from beneath the weighted lever 367. The arm 362 is then in the position the reverse of that shown in Figure 25 and as a consequence as the weighted arm 367 drops it will shift the lever 362 into the position shown in said figure. In so doing it will shift the position of the valve 379 and, through the link 385 and the pin 386, will shift the position of the valve 317 through the action of the pin upon the upstanding arm or lever 393. This will shut off the air from the pump motor 381. It will also admit air under pressure to the cylinder 313 and open the drain valve 307.

Simultaneously with the opening of the drain valve 307 with a view of facilitating the removal of the liquid or oil from the treating cylinder 126 it is designed to permit air under pressure to flow into the treating cylinder to force the liquid therefrom prior to the opening of the doors. To that end a valve 402 (see Figures 16, 24 and 25) controls an air line 403 which is connected in turn to the oil pressure line 384. This valve 402 is closed so long as the pump is operating. When, however, the pump ceases to operate the valve 402 is automatically opened to admit air under pressure to the cylinder 126 for the purpose of more quickly emptying the treating cylinder. As will be seen upon reference to Figure 24, the spindle of the valve 402 has secured to it an arm or lever 404 which extends outwardly into the path of movement of the nose 321 carried by the arm 319. As the lever 319 is moved in a clockwise direction (Figure 24) it will contact the arm 404 and open the valve 402. The pivoted nose 321 will permit the lever to move in an opposite direction without actuating the valve arm 404.

Secured to the spindle of the valve 402 is a pinion 405 which is in mesh with a rack 406, the rack being provided at one end with a downwardly projecting member 407 bearing against a cam 408 mounted upon the tubular element or sleeve 271. Upon rotation of said member the cam 408 moves the valve in a direction opposite from that which obtains through the actuation of the arm 404. Thus it will be seen that the valve 402 is actuated first in one and then in the other direction and at stated intervals to admit air to the treating cylinder to force the liquid therefrom.

To effectuate shifting of the clutch sleeve or tubular member 271, heretofore described, through actuation of the shifter lever 277, the following mechanism is utilized (Figure 23):

Secured to the member 312 extending laterally and then rearwardly adjacent the cylinder 313 is a rigid arm or member 409 to the rear portion whereof, and to one side, is pivotally mounted an actuator. Said actuator has two elements 411 and 412 interconnected at their outer ends, the element 411 standing at right angles to the axis of the actuator while the member 412 is inclined thereto as shown in Figure 23. The lower edge of each of the members 411 and 412 is inclined upwardly toward the point of juncture of said members so as to provide means whereby the actuator may ride over the arm 281 as the bar 409 carries the actuator to the left, as shown in Figure 23. When the valve 307 is closed the parts will be drawn to the left from the position shown in Figure 23 at which time the actuator will have been tilted up by the beveled surfaces formed thereon and the vertically disposed face of the element 412 will have moved to the rear of the arm 281. As the parts are moved to the right the vertical face of the member 412 will contact the arm 281 and by reason of the inclination of such face it will rock the shipper arm 277 to the left, causing a shifting of the clutch sleeve 271. This movement of the parts also carries the arm 279 over the arm 255 which at that time is lowered. The shifting of the member 271 brings the right hand clutch shown in Figure 24 into operation. Thereupon the shaft 272 will be rotated in a clockwise direction through one complete revolution during which time the cam 408 will close the valve 402 and shut off the flow of air to the treating cylinder. Cam 269 also comes into operation to lift the pin 268 thereby raising the locking plate 266, freeing the cam 264 from engagement therewith, and permitting the weight 263 to rotate shaft 257 throwing the lever 255 upwardly and moving the draw bar or link 254 upwardly. At the same time the lever 255 will contact the under face of the arm or finger 279 and throw the shipper arm 277 to the right or in the position shown in Figure 24. This brings the clutch sleeve or tubular element 271, and its associated parts, to rest. The upward movement of the member 254 opens the valve 249 to admit air to the cylinders 245 to move the doors to open position.

When the doors are open it is of course essential to remove the tie from the treating cylinder. As heretofore described, the rod 129 is moved inwardly and engages the rear end of the tie, pushing it along over the supporting rollers 156 mounted within the treating cylinder 126 and at such time passing the tie onto the off-take or receiving unit. Said off-take or tie receiving mechanism will best be seen upon reference to Figure 1 and Figures 29 to 32, both inclusive. Broadly stated it may be said to comprise a driven transfer device or means associated with a receiving trough designed to ultimately receive the tie, said trough being placed in cooperative relation with suitable skids and conveying mechanisms.

Located adjacent the discharge end of the cylinder 126 is a frame-work denoted generally by 413 upon which is mounted the tie withdrawing and transfer mechanism. Driving shaft 59, heretofore referred to, is provided with a worm wheel 414 in mesh with a worm wheel 415 secured to a shaft 416 mounted in suitable bearings upon the frame 413. The shaft carries a sprocket wheel 417 about which passes an endless sprocket chain 418, the chain also passing over a sprocket 419 secured to a shaft 421. Said shaft has secured to it a toothed roller 422, the shaft being journalled in a frame composed of two fixed side plates 423 and 424. A second toothed roller 425 is mounted between the side frames 423, 424 and at one end its supporting shaft carries a sprocket 426 about which passes a sprocket chain 427, said chain passing about a second sprocket 428 secured to the shaft 421. It will thus be seen that the rollers 422 and 425 are driven in a direction to withdraw a tie from the cylinder and advance it onto and over a series of rollers 429 mounted in a frame-work composed of two parallel side bars 431 and 432 secured together by a plurality of cross bars 433. The frame thus constructed is supported upon a plurality of brackets 434, the connection being an adjustable one by a bolt and slot arrangement so that the roller-carrying frame may be shifted laterally with reference to the bracket. The brackets are keyed or otherwise secured to a rocker shaft 435 mounted in suitable bearings carried by the frame 413. The roller-carrying frame is normally held in a horizontal position so that the rollers 429 are aligned with the rollers 422 and 425 by a series of weighted arms 436 extending laterally therefrom.

Assuming that the first tie which has been treated in the cylinder is passed outwardly therefrom when the cylinder doors are open, the rollers will advance the tie onto the rocking platform just described. At such time the platform is locked against tilting movement. To that end a sliding latch shown in detail in Figures 32 and 33 is employed. It consists of a plate-like element 437 provided at its inner end with a stem 438 which passes through an opening formed in a cross bar 439, a coil spring 441 encircling the stem and bearing against the inner face of the bar and against the body of the plate serving to project the latch plate 437 outwardly. Plate 437 is provided with a slot 442 through which extends a bolt 443 which serves to guide the plate and likewise to limit its outward movement. Extending upwardly from the plate 437 is a vertically disposed member or column 444 which at its upper forward face is provided with a rounded nose or projection 445. At the forward edge of the plate 437 and in line with the column 444 is a lug or projection 446, the forward end whereof is beveled.

A latch bar 447 is designed to cooperate with the lug 446 (see Figures 29 and 32), said bar being secured at its opposite end to the rocker shaft 435. When the parts are engaged as shown in the figures just referred to, the bar 447 is prevented from moving downwardly under the weight of a tie which would be resting upon the tilting roller platform. It is therefore necessary to release the latch from the bar and this is brought about through the provision of a lug 448 (see Figure 1 and Figures 20 to 22, both inclusive) extending laterally from the cylinder door. Said lug is rounded and stands in line with the lug 445 formed upon the latch. When the door is first opened, and there being no tie upon the tilting roller platform, the latch will be moved inwardly and then permitted to come outwardly without causing the platform to tilt. When, however, the door is swung to its closed position the latch will be again actuated, freeing the bar 447 and permitting the platform to tilt under the weight of the tie imposed thereon. The door, of course, moves entirely out of the way and as a consequence as soon as the tie is discharged from the tilting platform the latter will swing back to the horizontal and the bar 447 will be re-engaged by the lug or nose 446 of the latch. Thus the platform will be in a position to receive the next tie ejected and withdrawn from the treating cylinder. The tie, as it is discharged from the tilting platform, passes onto inclined roller skids 449, which in the instant case are shown associated with the endless sprocket chains 451 provided with lugs 452. Said chains 451 derive their motion from sprockets 453 (see Figure 30) secured to a shaft 454, which latter derives its motion from the shaft 59 through sprocket chains 455.

The chains 451 deliver the ties to a truck or conveyor or to a storage bin as the case may be.

As above noted, the tie feeding and advancing mechanism may be employed in conjunction with a plurality of treating cylinders or with a single cylinder. The mechanism employed in conjunction with a single cylinder will be best understood upon reference to Figures 35 and 36, wherein parts similar to those heretofore described as indicated by the same reference numeral with the exponent "d". As will be seen upon reference to said figures, they correspond in the main to Figures 3 and 4, respectively, and, as will be noted, the transfer carriage and its allied parts are omitted. Secured to the stop 106$^d$, at the upper portion thereof, is a fixed element 500 which functions with the member 15$^d$ of the lever 13$^d$ to rock the latter in the manner heretofore set forth in connection with the construction previously described.

A weighted lever 501 extends outwardly from the member 106$^d$. A fixed bracket 502 also secured to the member 106$^d$ underlies the lever 501 and maintains it in its proper position. The outer end of the lever 501 stands in alignment with the pin 18ᵈ carried on the lower end of the T-shaped lever 13ᵈ so that when the parts come to the position shown in Figure 35 the lever 501 will have contacted the outer beveled end of the arm or latch 17ᵈ, releasing it from the pin 18ᵈ. Continued movement brings the arm 501 into contact with the pin 18ᵈ positively moving the lever 13ᵈ to position the roller 16ᵈ against the oncoming face of the next tie.

As above indicated, it is the object of this invention to secure uniform impregenation of a plurality of ties, irrespective of their varying physical characteristics. It is thought from the foregoing description that the operation of the apparatus will be fully understood. A brief résumé will, however, be given.

The ties are placed upon the upper end of the skidways 12, and pass downwardly thereon until arrested by the roller 16 (Fig. 3). This roller is carried by a lever normally locked in the position shown in Fig. 3, and released periodically when it is necessary that the tie be fed forwardly onto skidways 27 and 28, forming a part of a reciprocating carriage located at the lower end of the skidways 12 and movable in a horizontal direction toward the skidway 46. This carriage 19' is actuated in its forward and rear movement through mechanism above described, and best shown in Figs. 7 to 10.

An endless chain 66 passes through the box-like element 68 secured to the carriage, and moves the locking element or slide 69, which is alternately thrown by lever 73 and related parts, into engagement with opposite runs of chain 66 and, consequently, moves the carriage in one or the other direction. Cam bar 75 acts to move lever 73 and to thereby shift member 69.

To prevent the duplicate delivery of ties to a single unit, or a plurality of units as the case may be, we employ a stop arm 89. This arm functions as described above with the cam bar 75, and prevents the member 75 from shifting the parts.

The weighted lever 24 carries a forwardly and upwardly extending arm 25, which is depressed by the descending tie as it moves onto the skidways 27 and 28 of the carriage. The member 24 stands in line with a latch member 17 which coacts with the pin 18 carried upon the lower portion of the rocking member 13. (See Fig. 5.)

When the parts are in the position shown in Fig. 5, the carriage is supposed to have been moved forward and to have deposited a tie upon the skidway 46, and in its movement backward the member 24 will contact the outer rounded nose of member 17 and release it from the pin 18, causing the lever 13 to be freed and to be swung to the position shown in Fig. 1, by a rearward movement of the member 24, which at that time contacts the pin 18 and rocks the lever in front of an oncoming tie.

As the carriage moves away from the skidways 12, the notched member 26 acting upon the member 15, rocks the lever 13 and lowers the roller 16, so that another tie may advance along the skidways 12. In other words, the stop roller 16 is lowered during such movement.

A tie having been placed upon the pivoted member 28 of the skidway mounted on the carriage, the carriage is moved forwardly and the tie is deposited on the skidway 46. The arrangement as above set forth in detail, is such that the carriage cooperates with tracks 34 and suitable gates or switches mounted in the track, to cause the pivoted portion 28 of the skids to tip or tilt, and deposit the tie upon the skids 46.

The tie passing from the member 28 onto skidway 46, comes in contact with arm 45 and depresses the same. Through the connections heretofore described, the shaft 39 is rotated and the switch 38 moved downwardly, or to closed position. The gate 37 is a gravitating one, and permits the carriage to move upwardly upon the curved member 35, and onto the track in its rearward movement.

Passing down the skidway 46, the tie comes against a fixed stop 48 (Fig. 3), preparatory to being moved over and lowered onto the rollers 124, 125, located at each side of the conveyer chain which is employed to move the tie forwardly into the treating cylinder.

The tie, when it comes to rest against the stop 48, overlies the lifting and transfer mechanism composed of the lifter plates 107, supported on the carriage by suitable links 109 and 111, and their associated parts. These links are attached to a carriage designed to be moved back and forth in the guide rails 99, through operation of the rack and pinion 116, 117. The lifter plates are forced to move upwardly through the cooperation of a pin 112 and cam 113 (Fig. 3).

It will be readily appreciated that as the carriage moves to the left in Fig. 3, the pin striking the cam surface 113 will elevate the lifter plates and their associated portions, and lift the tie from the skid 46 and carry it to the position shown in Fig. 4, directly above the rollers 124, 125 and the chain employed to advance the tie into the cylinder.

As the carriage reaches its limit of movement to the left, Figs. 1 and 13, the pin 112 will drop off of the end of the member 114, and upon a reverse movement will move back beneath the same and beneath the pivoted cam member 113. At such time, the tie stands in alignment with the open end of the treating cylinder. The tie is then advanced into the cylinder by a lug 128, extending upwardly from an endless chain 127, which is driven as are other moving parts, by motor 54 (Fig. 1).

The chain 127 cannot, of course, introduce the tie fully into the cylinder, and a supplemental mechanism is employed to effect this final movement prior to the closing of the cylinder door. This supplemental mechanism may be said to comprise a pivoted member 152, normally standing in the position shown in Fig. 4.

When the tie is advanced as far as it can be by the lug on the endless chain, the member 152 will move to the position shown in Fig. 3, from the position it previously occupied in Fig. 4.

As the parts move from the position shown in Fig. 4 to that of Fig. 3, the tie having been advanced by the lug 128 to a position where the forward end of the push bar 129 may drop to the rear of the tie, the spring 148 will act to throw the members 131 and attached parts downwardly. The parts will then come to the position shown in Figs. 3 and 13. The mechanism is such that the push rod 129 moves the tie fully into the cylinder and is subsequently withdrawn through the action of a weight 158. After the final tie has been treated, the rod 129 is projected to its full extent, to push the tie out of the cylinder.

As above noted, a given quantity of oil is admitted to the cylinder through the weir mechanism, and a given quantity is displaced according to the cubic content of the tie. The segregated portion is then forced into the cylinder and into the tie. Inasmuch as this takes place with each tie, only a given quantity of liquid will be forced into the tie, irrespective of its physical characteristic.

The tubular member 131 and its associated parts, in which the rod 129 is mounted, are moved from the position shown in Fig. 4, to that shown in Fig. 3. When the parts are in this relation, the lug 151 contacts the member 152 and through the connection of the latter with the rod 129, moves the rod forwardly causing it to hit the end of the tie and move the tie inwardly to the desired extent within the cylinder. When the tie is pushed through the mechanism above described, the doors of the treating cylinder are closed, and the oil is introduced as heretofore described and as set forth in Letters Patent to Theodore W. Smith, Nos. 1,731,443 of October 15, 1929 and 1,838,585 of September 29, 1931. This insures that each tie will be treated with the same amount of oil.

After the tie has been impregnated, the treating cylinder is drained, the doors opened and another tie introduced, which of course abuts the tie already treated and moves it outwardly until it comes into contact with the constantly-driven toothed rollers 422, 425. These advance the treated tie onto the tilting platform, best shown in Figs. 29 and 30, the tie readily moving thereon by reason of the fact that the bottom of the platform is formed by the rollers 429. The platform is normally locked in position by a latch mechanism which prevents the platform from tilting, but when the latch is released, as it is when the door of the cylinder adjacent thereto is swung to its open position, the platform will tilt and discharge the tie onto skidways 449, which in turn discharge it onto chains 451 provided with lugs 452.

The mechanism so far described and shown in the drawings other than Figs. 35 and 36, is designed to be employed with a plurality of cylinders as the carriage will move forwardly without tilting past a cylinder which may have a tie in front of it which has not been moved into the cylinder. At such time the tie would depress the member 28 (Fig. 3) and lower the gate or member 38 and prevent the member 28 from rocking, with a view of discharging the tie therefrom.

In Figs. 35 and 36, a construction is shown wherein but a single cylinder is to be employed. In these figures, parts similar to those heretofore described are indicated by the same reference numeral with the exponent "d". The transfer carriage carrying the skids 27 and 28 is omitted, and the upper skidway 12$^d$ discharges the tie directly onto the lower fixed skidway 46$^d$. The lifting mechanism for positioning the tie over the chain and upon the rollers is the same.

It is believed that the foregoing, which outlines the operation, when read in connection with the specification and drawings for minor details, clearly sets forth the broad principle underlying the invention.

In the broader aspect of the invention the apparatus may be employed without segregating a quantity of the oil, or in other words the oil may be forced into the successive tie without necessarily pre-measuring it. So too, various modifications will suggest themselves to those skilled in the art and such modifications are to be included within the scope of the appended claims. No claim is made herein specifically to the cylinder closure mechanism, the same forming the subject matter of our application Serial No. 619,344, filed June 25, 1932 and allowed April 11, 1933.

What is claimed is:

1. An apparatus for impregnating ties including in combination a cylinder; closure means therefor; means for actuating said closure means; means located in line with the cylinder for introducing a tie into the same; a carriage movable toward and from said tie introducing means and adapted to position a tie with reference thereto; mechanism for causing the carriage, the tie introducing means and the closure for the cylinder to operate in proper time and sequence; and means for forcing oil into the cylinder.

2. In an apparatus for impregnating ties, the combination of a cylinder; closure means therefor; means located in line with the cylinder adjacent one end thereof for introducing a tie into the same; a fixed skidway adjacent said tie introducing means; a second skidway located at a point above and spaced from said first skidway; a reciprocating carriage movable between said skidways for transferring ties one by one from said second skidway to the first named skidway; means for reciprocating said carriage; and means for preventing the removal of a tie from the carriage and onto the first named skidway when a tie is resting on said first named skidway.

3. An apparatus as set forth in claim 2, wherein the reciprocating carriage has a tilting movement to allow the tie to pass therefrom onto the first named skidway.

4. An apparatus as set forth in claim 2, wherein the reciprocating carriage has a rocking motion and is movable over a trackway provided with a normally open bridge which latter, when the carriage moves rearwardly, causes the carriage to tilt and to thereby discharge the tie onto the first named skidway.

5. An apparatus as set forth in claim 2, wherein there is a track provided with a normally open bridge, together with means connected to the bridge and associated with the first named skidway to close said bridge in the presence of a tie deposited on said first named skidway from the carriage whereby upon rearward movement of the carriage tilting thereof will be prevented.

6. In an apparatus for impregnating ties, the combination of a cylinder; closure means therefor; means for introducing a tie into the cylinder; a fixed skidway located adjacent said tie introducing means; transfer mechanism associated with the lower end of said fixed skidway; means for actuating said mechanism to remove the tie from the skidway and transfer it over and into operative relation with the tie introducing means; and means for preventing the transfer of a tie if one be in position with reference to the introducing means.

7. An apparatus as set forth in claim 6, wherein the transfer mechanism comprises supporting plates located adjacent the lower end of each member of the fixed skidway; a reciprocating carriage; links extending from said carriage to the under portion of said plates; and means for raising said plates as the carriage moves toward the tie introducing means to lift the tie from the skidway and to place it in operative position with reference to said introducing means and to thereafter drop away from the tie prior to retraction of the carriage.

8. In an apparatus for impregnating ties, the combination of a cylinder; means for introducing a tie into the cylinder; a fixed skidway located to one side of said tie introducing means; a transfer mechanism located adjacent the lower end of said fixed skidway; means for actuating said transfer mechanism to remove a tie from said fixed skidway and position it with reference to the tie introducing means; a second skidway located above and spaced from the upper end of the first named skidway; a trackway extending into the space between said skidways, a reciprocating and tiltable carriage mounted for movement along said trackway; a normally open bridge located in said trackway; means associated with the first named skidway for normally holding said bridge in its open position, said means under the weight of a tie, as it is passed onto the first named skidway, closing said bridge and serving to hold it closed until the tie is removed from the skidway; and means for reciprocating said carriage.

9. An apparatus as set forth in claim 8, wherein the trackway is provided with a second gravitating bridge and said trackway is likewise provided with a depressed portion which may be closed by the bridges.

10. In an apparatus for impregnating ties, the combination of a cylinder; an endless chain located in line with one end thereof; a lug extending outwardly from said chain; rollers located to either side of said chain; means for depositing a tie upon said rollers and over the chain with the rear end of the tie in line with the lug aforesaid; means for driving the chain; a push rod for moving the tie into the cylinder after the lug upon the chain has practically positioned the tie within the cylinder and moved out of contact with the tie; and means carried by the chain for actuating the push rod.

11. An apparatus as set forth in claim 10, wherein the rod is mounted in a carrier which normally lies in the path of movement of the tie.

12. An apparatus as set forth in claim 10, wherein the rod is housed within a slotted tube, said tube being secured to pivoted supports; and means for normally throwing said rod downwardly into the path of movement of the tie.

13. A structure as set forth in claim 10, wherein the rod is housed within a slotted tube; pivotal supports for said tube; a projection extending outwardly from said rod through the slot in the tube, said projection, when the tube is swung downwardly adjacent the support for the tie, standing to one side and adjacent to the chain; a lug extending outwardly from said chain and contacting said projection; and means for normally retracting the rod when released from driving connection with the chain.

14. In an apparatus for impregnating a series of ties one by one, the combination of a cylinder; means for introducing ties into the cylinder one by one, said means including mechanism for partially introducing a tie into the cylinder and a second mechanism for thereafter completing the introduction of the tie into the cylinder; means for placing ties one by one into operative position with reference to said introducing means; and means for causing the second mechanism aforesaid to pass into the cylinder to project the last treated tie of the series therefrom.

15. An apparatus as set forth in claim 14, wherein a mechanically actuated off-take is associated with the cylinder at the discharge end thereof.

16. An apparatus as set forth in claim 14, wherein means is provided for securing withdrawal of said second mechanism to normal position when the tie has been projected.

17. In an apparatus for impregnating a series of ties one by one, the combination of a treating cylinder; a mechanically driven off-take mechanism located adjacent the discharge end thereof; means for moving ties one by one into line with the opposite end of the cylinder; means for partially placing ties one by one in the cylinder; and means engaging the ties thus partially placed and moving them wholly into the cylinder, said means when acting upon the last treated tie having an amplitude of movement sufficient to project said tie from the cylinder.

18. An apparatus as set forth in claim 17, wherein the means for moving the ties into the cylinder comprises an endless chain; a lug thereon to engage the rear end of the tie; a reciprocating rod; means carried by the chain and cooperative with the rod to move the rod forwardly a distance sufficient to complete the placement of the tie in the cylinder; means for drawing the rod rearwardly away from the cylinder; and other means carried by the chain and cooperative with the rod to move the rod forwardly in contact with the last tie of the series to project it from the cylinder onto the off-take mechanism.

19. In an apparatus for impregnating ties one by one, the combination of a cylinder; an endless drive therein located in line with the cylinder; a lug carried thereby adapted to engage the ties one by one; a push rod; a housing for said rod, said housing being pivotally supported to a fixed portion of the apparatus and normally thrown down toward the chain; a reciprocating carriage for positioning the ties one by one into operative relation with the chain; means actuated by said carriage to raise the rod housing away from the chain; and means cooperative with the chain to move the rod endwise toward the cylinder.

20. An apparatus as set forth in claim 19, wherein the cooperative means, when acting upon the last treated tie, has an amplitude of movement sufficient to project the tie from the cylinder.

21. In an apparatus as set forth in claim 2, wherein means is present for preventing transfer of a tie from the second skidway to the carriage should there be a tie upon the carriage.

22. In an apparatus for successively impregnating a series of ties one by one, the combination of a cylinder; closures therefor; mechanically actuated means for introducing the ties into the cylinder one by one; means for opening and closing said closures; means for forcing oil into a tie within the cylinder; mechanically actuated means for receiving the ties as they are partially moved from the cylinder by an oncoming tie and fully withdrawing the same; mechanically actuated means for moving the last tie of the series longitudinally of the cylinder and into operative relation with the tie withdrawing means, said means for moving the said last tie means being inoperative at other times; and mechanism for causing the various means to operate in proper time and sequence.

MELVIN E. CROWELL.
THEODORE W. SMITH.